(12) United States Patent
Saeed et al.

(10) Patent No.: US 10,592,146 B2
(45) Date of Patent: Mar. 17, 2020

(54) DATA PROCESSING SYSTEMS

(71) Applicant: ARM Limited, Cambridge (GB)

(72) Inventors: Sharjeel Saeed, Cambridge (GB); Kushan Vijaykumar Vyas, Cambridge (GB); Michal Karol Bogusz, Cambridge (GB); Piotr Tadeusz Chrobak, Cambridge (GB); Ozgur Ozkurt, Cambridge (GB)

(73) Assignee: Arm Limited, Cambridge (GB)

( * ) Notice: Subject to any disclaimer, the term of this patent is extended or adjusted under 35 U.S.C. 154(b) by 12 days.

(21) Appl. No.: 15/635,099

(22) Filed: Jun. 27, 2017

(65) Prior Publication Data

US 2018/0373432 A1  Dec. 27, 2018

(51) Int. Cl.
*G06F 13/00* (2006.01)
*G06F 3/06* (2006.01)
*G09G 5/395* (2006.01)
*G06F 13/38* (2006.01)

(52) U.S. Cl.
CPC ............ *G06F 3/064* (2013.01); *G06F 3/0611* (2013.01); *G06F 3/0673* (2013.01); *G06F 13/38* (2013.01); *G09G 5/395* (2013.01); *G09G 2330/021* (2013.01)

(58) Field of Classification Search
CPC ................................ G06T 1/60; G09G 3/3225
See application file for complete search history.

(56) References Cited

U.S. PATENT DOCUMENTS

| 2005/0012752 | A1* | 1/2005 | Karlov | G06T 1/60 345/538 |
| 2013/0034309 | A1 | 2/2013 | Nystad | |
| 2015/0054800 | A1* | 2/2015 | Kim | G09G 3/3225 345/204 |
| 2017/0061869 | A1* | 3/2017 | Bae | G09G 3/3275 |

\* cited by examiner

*Primary Examiner* — Ryan Bertram
*Assistant Examiner* — Trang K Ta
(74) *Attorney, Agent, or Firm* — Vierra Magen Marcus LLP

(57) ABSTRACT

A method of operating a data processing system 4 is disclosed that comprises producing data in the form of blocks of data, where each block of data represents a particular region of a data array, processing the data using a processing operation in which one or more output data values are each determined using data values from plural different lines of the data array, storing the processed data in a memory 21 of the data processing system, and reading the data from the memory 21 in the form of lines.

17 Claims, 10 Drawing Sheets

DATA PROCESSING SYSTEMS

BACKGROUND

The technology described herein relates to data processing systems, and in particular to the processing of data when generating an image for display on a display in a data processing system.

In data processing systems, it can often be the case that data is generated or otherwise provided in a format that is different to a format that is subsequently required. This may be the case, for example, when processing an image for display. In this case, data in respect of an image to be displayed may be generated in the form of plural two-dimensional blocks (arrays) of data positions (e.g. "tiles"), but may be further processed and/or provided to a display (such as a display panel) in the form of plural one-dimensional lines of data positions (e.g. raster lines).

One exemplary such arrangement is in a display controller, where input blocks (arrays) of data may be used in the form of raster lines (e.g. when generating output frames for display on a display).

In such arrangements, the data processing system must effectively convert from one format to the other. This can be achieved using a so-called "de-tiler", where the data is written in the form of plural blocks of data to a buffer, and is then read out from the buffer in the form of lines of data.

The image data read out from the buffer (in the form of lines) may then be further processed. For example, the data may be filtered, and/or scaled (e.g. upscaled or downscaled), etc.

In these processes, it can often be the case that data values of plural (input) data positions are used to determine the data value for each output data position. For example, the data values of a group of (input) data positions within a "moving window" may be used to determine the data value for each output data position.

In these processes, where data values of plural (input) data positions from plural different lines are to be used to determine output data position data values, plural lines of data will normally be stored (buffered) locally to the processing stage that performs the processing operation in question (e.g. filter, scaler, etc.), i.e. to ensure that the processing stage has access to all of the data that is necessary for its processing operation.

The Applicants believe that there remains scope for improvements to data processing systems.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
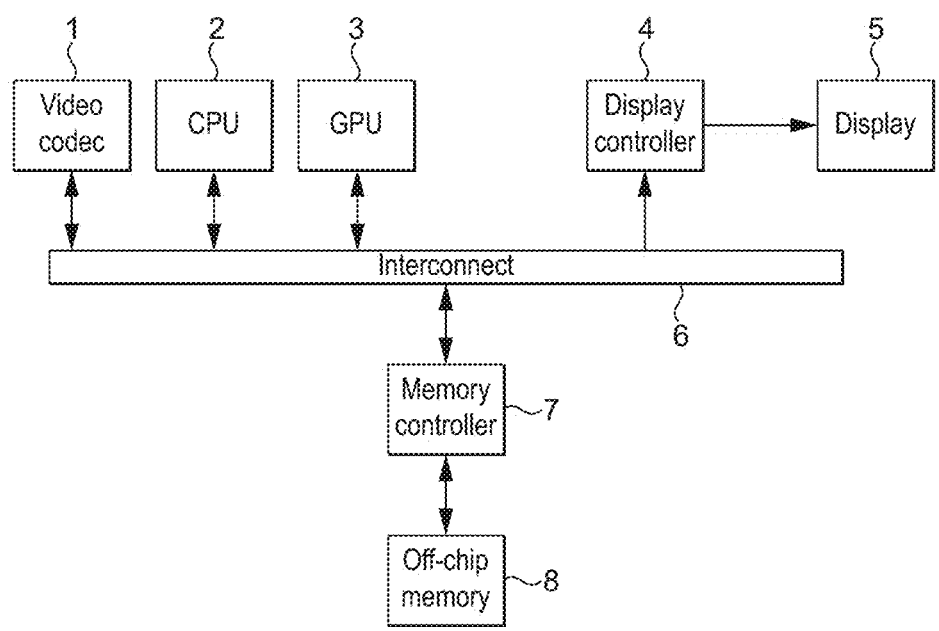
FIG. 1 shows schematically a data processing system in accordance with an embodiment of the technology described herein.

A first embodiment of the technology described herein comprises a method of operating a data processing system comprising:

producing data in the form of blocks of data, where each block of data represents a particular region of a data array;

processing the data using a processing operation in which one or more output data values are each determined using data values from plural different lines of the data array;

storing the processed data in a memory of the data processing system; and reading the data from the memory in the form of lines.

A second embodiment of the technology described herein comprises a data processing system comprising:

a first processing stage operable to produce data in the form of blocks of data, where each block of data represents a particular region of a data array;

a second processing stage configured to process the data using a processing operation in which one or more output data values are each determined using data values from plural different lines of the data array;

a memory, wherein the data processing system is configured to store the processed data in the memory; and a third processing stage operable to read the data from the memory in the form of lines.

The technology described herein is concerned with a method of operating a data processing system in which data is produced in the form of plural blocks of data that each represent a particular region of a data array, and is subsequently read from a memory in the form of lines, i.e. a de-tiler arrangement.

When it is desired to process the data using a processing operation in which an (individual) output data value is, or plural (individual) output data values are each, determined using input data values from plural different lines of the data array, the data (in the form of blocks of data) is processed in this manner prior to the data being stored in the memory.

In this regard, the Applicants have recognised that, since the blocks of data will be (and in an embodiment are) each representative of (comprise) data values from plural different lines of the data array, it is possible to perform (at least some of) the processing operation (in which an (individual) output data value is, or plural (individual) output data values are each, determined using input data values from plural different lines of the data array) on the blocks of data themselves. This is in contrast with conventional techniques in which the processing operation is performed on the lines of data, i.e. as they are read out from the (de-tiler) memory.

Moreover, the Applicants have recognised that (as will be described in more detail below) configuring the data processing system in this manner can beneficially reduce the overall power usage of the data processing system.

It will be appreciated, therefore, that the technology described herein provides an improved data processing system and method of operating a data processing system.

The data processing system of the technology described herein is operable to produce data in the form of blocks of data, where each block of data represents a particular region (area) of a data array.

The (input) data array in an embodiment comprises an array of plural data positions, with each data position having a particular data (e.g. colour) value. In an embodiment, the data comprises image data, i.e. an array of image (colour) data, e.g. a frame, for display or otherwise.

The (input) array should (and in an embodiment does) have a given horizontal and vertical size (in terms of the number of data positions in the horizontal and vertical directions for the data array). Thus, the data array in an embodiment comprises plural columns of data positions and plural rows (lines) of data positions.

The data values for the data positions of the data array can be any suitable and desired data values. In an embodiment, the data values represent colour values such as RGB or YUV colour values (where the data array is an image, e.g. for display), but they could be other data values for other types of data array, as and if desired.

Each block of data represents a particular region of the (input) data array. Each block of data should, and in an embodiment does, comprise at least two rows (lines) and at least two columns of data positions of the data array.

Thus, in an embodiment, the array of data produced by the data processing system is divided or partitioned into a plurality of identifiable smaller regions each representing a part of the overall array, and that can accordingly be represented as blocks of data.

The sub division of the array into blocks of data can be done as desired, and each block of data can represent any suitable and desired region (area) of the overall array of data.

Each block of data in an embodiment represents a different part (sub-region) of the overall array (although the blocks could overlap if desired). Each block should represent an appropriate portion (area) of the array (plurality of data positions within the array).

In an embodiment, the array of data produced by the data processing system is divided into regularly sized and shaped regions (blocks of data), in an embodiment in the form of squares or rectangles. Suitable data block sizes would be, e.g., 8×8, 16×8, 16×16, 32×4, 32×8, or 32×32 data positions in the data array. Other arrangements would, of course, be possible.

Thus, in an embodiment the array of data is divided into an array of regularly sized and shaped regions (blocks of data), e.g. such that the array comprises plural rows of blocks of data and plural columns of blocks of data.

Each row of blocks of data should, and in an embodiment does, comprise a row of blocks of data that is one block high and many blocks wide (long). Each row of blocks of data in an embodiment has a width corresponding to (equal to) the width of the overall array of data produced by the (first processing stage of the) data processing system. Each row of blocks of data in an embodiment has a height corresponding to (equal to) the height of a single block of data produced by the (first processing stage of the) data processing system.

Correspondingly, each column of blocks of data should, and in an embodiment does, comprise a column of blocks of data that is one block wide and many blocks high. Each column of blocks of data in an embodiment has a height corresponding to (equal to) the height of the overall array of data produced by the (first processing stage of the) data processing system. Each column of blocks of data in an embodiment has a width corresponding to (equal to) the width of a single block of data produced by the (first processing stage of the) data processing system.

In an embodiment, each data block produced by the data processing system corresponds to a "tile", e.g. that a (first) processing stage of the data processing system produces as its output.

(In tile-based data processing systems, the two dimensional array (e.g. frame) of the data processing system is sub-divided or partitioned into a plurality of smaller regions, usually referred to as "tiles", for the data processing. The tiles (sub-regions) may each be processed separately (e.g. one after another or in parallel). The tiles (sub-regions) may be recombined, if desired, to provide the complete array (frame), e.g. for display.

Other terms that are commonly used for "tiling" and "tile based" processing include "chunking" (the sub-regions are referred to as "chunks") and "bucket" data processing. The terms "tile" and "tiling" will be used herein for convenience, but it should be understood that these terms are intended to encompass all alternative and equivalent terms and techniques.)

The data processing system of the technology described herein may produce data in the form of blocks of data in any suitable manner. The blocks of data are in an embodiment produced in a block by block manner, i.e. from one block to the next, in an embodiment in raster line order (i.e. where the blocks of one row are produced in order, followed by the blocks of the next row, etc.), e.g. across the entire data array.

The data processing system may comprise a first processing stage that is operable to produce data in the form of blocks of data. The first processing stage may comprise, for example, a decoder, a rotation stage, a graphics processing unit (GPU), a central processing unit (CPU), a video codec, a compositor, etc.

There may be a single first processing stage or there may be plural first processing stages operable to produce data in the form of blocks of data. Where there are plural first processing stages, then each first processing stage is in an embodiment operated in the manner of the first processing stage described above.

The data may be produced by the first processing stage generating the data, e.g. by generating the data itself, and/or by reading or receiving data from elsewhere (such as from memory or one or more other processing stages of the data processing system), and then processing (e.g. modifying) that data.

In embodiments where data is read from memory, the memory may comprise any suitable memory and may be configured in any suitable and desired manner. For example, it may be a memory that is on chip with and/or local to the processing stage in question or it may be an external memory. In an embodiment it is an external memory, such as a main memory of the data processing system. It may be dedicated memory for this purpose or it may be part of a memory that is used for other data as well. In an embodiment the data is read from (and stored in) a frame buffer.

Correspondingly, in embodiments where data is read from memory, the data processing system and/or the first processing stage may comprise a read controller, such as a Direct Memory Access (DMA) read controller operable to read data from the memory.

In an embodiment, the (first processing stage of the) data processing system comprises a decoder, in an embodiment an ARM Frame Buffer Compression (AFBC) (or other block-based encoding scheme) decoder (AFBC is described in US A1 2013/0034309), which is operable to decode (decompress) data such as one or more received (in an embodiment AFBC) encoded (compressed) blocks of data, which are, e.g., read from memory. Accordingly, in this embodiment, the (first processing stage of the) data processing system comprises a (AFBC) decoder that decodes and/or decompresses (blocks of) (AFBC) encoded data to produce decoded and/or decompressed (e.g. colour) data (e.g. blocks of decoded and/or decompressed data).

In another embodiment, the (first processing stage of the) data processing system comprises a rotation stage which is operable to rotate data such as one or more received blocks of data, which are, e.g., read from memory. Accordingly, in this embodiment, the (first processing stage of the) data processing system comprises a rotation stage that rotates (blocks of) (e.g. colour) data to produce rotated data (e.g. blocks of rotated data).

In the technology described herein, the data is processed using a processing operation in which one or more output data values are each (i.e. an (individual) output data value is, or plural (individual) output data values are each) determined using data values from plural different lines of the data array. The data should be (and is in an embodiment) processed to produce a processed (e.g. modified) (output) version of the data, i.e. a processed (e.g. modified) (output) version of the (input) data array.

The output data array in an embodiment comprises an array of plural (output) data positions, with each (output) data position having a particular data (e.g. colour) value. Accordingly, in an embodiment, the data (in the forms of blocks of data) is processed so as to determine the data values for (an array of) plural output data positions.

The output array should (and in an embodiment does) have a given horizontal and vertical size (in terms of the number of data positions in the horizontal and vertical directions for the output data array). Thus, the output data array in an embodiment comprises plural columns of data positions and plural rows (lines) of data positions. The output array may have the same (horizontal and vertical) size as the input data array (in which case each data position of the input data array in an embodiment corresponds to a respective data position of the output data array (and vice versa)), or (e.g. where, as discussed in more detail below, the processing operation includes scaling) the (horizontal and/or vertical) size of the output array may be different to the input array.

In the technology described herein, the data (in the form of blocks of data) should be (and is in an embodiment) processed prior to being written to the memory.

In an embodiment, when it is desired to perform a processing operation in which one or more output data values are each determined using data values from plural different lines of the (input) data array, the data is processed in the manner of the technology described herein prior to being written to the memory. When it is not (when it is other than) desired to perform a processing operation in which one or more output data values are each determined using data values from plural different lines of the (input) data array, then the data need not be (and is in an embodiment not (is other than)) processed, and is in an embodiment instead written (directly) to the memory (i.e. without being processed), e.g. for reading in the form of lines.

The processing operation of the technology described herein will be described in more detail below.

In the technology described herein, the processed data is stored in a memory of the data processing system. The (second processing stage of the) data processing system in an embodiment writes the processed data to the memory, e.g. for reading in the form of lines.

The memory is in an embodiment a (local) buffer memory, of the data processing system. Thus, the data should be (and is in an embodiment) not (is other than) written out (e.g. to external memory or otherwise) from the processor in question (e.g. display controller), but in an embodiment instead remains internal to the processor in question (e.g. display controller), when it is stored in (and read from) the memory.

In an embodiment the memory forms part of a "de-tiler", e.g. of a display controller, operable to convert data received in the form of one or more blocks (tiles) to data in the form of lines, e.g. for further processing and/or display. Thus, in an embodiment, the data processing system comprises a de-tiler, and the memory comprises a buffer memory of the de-tiler.

The memory should (and in an embodiment does) have a particular size (i.e. a maximum amount of data that it can store).

It will be appreciated that since, in de-tiler arrangements, data is produced in the form of blocks (tiles) and then read in the form of lines, an appropriate (e.g. a full) line width of blocks (tiles) should be produced and stored in the memory before the set of data can be read "independently", i.e. before the data can be read in lines without requiring the production of further data while the data is being read. That is, at least one row of blocks of data should be produced and stored in the memory, where the row of blocks of data has a length (width) equal to the length (width) of each line of the overall data array.

Accordingly, the memory should be (and in an embodiment is) able to store at least a full line width (a full row) of blocks of data. Thus, the memory in an embodiment has a size that is sufficient to store at least one (full) row of blocks of data.

In an embodiment, the memory is able to store only one full line width (one row) of blocks of data. That is, the memory in an embodiment has a size that is sufficient to store only (i.e. that is not (is other than) larger than is necessary to store) one (full) row of blocks of data. This beneficial means that the size of the memory that is provided for storing the data is minimised (or at least reduced).

In the technology described herein, the data stored in the memory is read in the form of lines (of the output data array). The data is in an embodiment read in raster (line) order, i.e. from line to line.

Thus, where the output array of data comprises an array of plural data positions, the output array of data is in an embodiment read from data position to data position in raster line order.

Each line of data should, and in an embodiment does, comprise a row of data positions of the output data array that is one data position high and many data positions wide (long). Each line in an embodiment has a width corresponding to (equal to) the width of the overall output array of data produced by the (second processing stage of the) data processing system. Each line is in an embodiment read in full, but it would also be possible to only read a fraction of one or more or each line, e.g. half a line, etc.

Thus, in an embodiment, the data processing system is configured to produce regions in the form of two-dimensional blocks (arrays) of data positions (i.e. "tiles") of an input array (i.e. regions whose height and width are each greater than a single data position), to process those regions (blocks of data), to write the processed data to the memory, and to then read the processed output data array from the memory in raster order, i.e. in the form of lines (rows of data positions that are one data position high and many data positions wide (long)).

The data processing system is in an embodiment configured to read some but not all of the data positions from multiple stored blocks of data consecutively (i.e. rather than reading a complete block before starting the next block), e.g. and in an embodiment, line by line, where each line comprises a concatenated respective row of data positions from plural different blocks of data. Thus, each line of data positions that is read by the data processing system is in an embodiment taken from plural different blocks of data (tiles) stored in the memory.

In one such embodiment, the data positions from each corresponding line of each of plural blocks of data of each row of blocks of data are read consecutively, i.e. one after another before moving onto the next line. For example, the data positions in the top line of each of the blocks in a row of blocks can be read consecutively. The data positions in the second lines of each of the blocks in the row of blocks can then be read consecutively (together), and so on.

The data processing system of the technology described herein may be configured to read the data from the memory in the form of lines in any suitable manner.

The data processing system may comprise a third processing stage operable to read the data in the form of lines. The third processing stage may comprise or may form part of, e.g., a de-tiler (e.g. of a display controller), e.g. that is operable to convert data in the form of one or more blocks of data (tiles) to data in the form of one or more lines of data, e.g. for further processing and/or display.

There may be a single third processing stage or there may be plural third processing stages. Where there are plural third processing stages, then each third processing stage is in an embodiment operated in the manner of the third processing stage described above.

In an embodiment, the data processing system is operable to process the read data. For example, in an embodiment, the data processing system may comprise one or more layer or pixel processing pipelines operable to process the data in respect of each data position (pixel) as appropriate, e.g. for display.

The data processing system may also or instead be operable to cause at least some of the data and/or at least some of the processed data to be displayed. In an embodiment, the (display controller of the) data processing system is operable to provide the data (directly) to a screen, such as a display panel, for display.

To facilitate this, the data processing system in an embodiment comprises an output stage operable to provide an image for display to a screen (display panel). This output stage may be any suitable such output stage operable to provide an image for display to a screen (display panel), e.g. to cause an image for display to be displayed on a screen (display panel) (to act as a display interface). The output stage in an embodiment comprises appropriate timing control functionality (e.g. it is configured to send pixel data to the screen (display panel) with appropriate horizontal and vertical blanking periods) for the display.

In the technology described herein, individual output data values are determined using data values from plural different lines of the (input) data array. Thus in an embodiment, a data value for one or more, in an embodiment each, output data position of the output data array is determined using data values from plural different lines of the input data array. In an embodiment, for each output data position of the output data array, a data value is determined using the data values of plural input data positions, where the plural input data positions include data positions from plural different lines of the input data array.

In an embodiment, the data value for each output data position is determined using the data values from a respective group of plural input data positions (where the group of plural input data positions includes data positions from plural different lines of the input data array). In one such embodiment, the processing operation uses a "moving window" to determine the data value for each output data position.

As such, in these embodiments, each respective group (window) of input data positions in an embodiment comprises a (contiguous) group of adjacent data positions. A respective different group of input data positions is in an embodiment used in respect of at least some, and in an embodiment each, output data position (although it would be possible for plural of the output data positions to be determined using the data values from the same group of input data positions (and in some embodiments, this is the case)). In an embodiment, each respective different group of input data positions corresponds to, e.g. is centred on, the output data position in question.

In these embodiments, each group (window) of plural input data positions may have any suitable size and configuration (shape). All of the respective different groups (window) of input data positions in an embodiment have the same size and configuration (shape), but this need not be the case.

In one embodiment, each group (window) of plural input data positions includes data positions both from plural different lines of the input data array and from plural different columns of the input data array. For example, each group (window) of plural input data positions may be configured as a square or rectangular group of input data positions.

Thus, in an embodiment, the processing operation operates to process the data in both the vertical and horizontal directions.

However, in an embodiment, the group (window) of plural input data positions includes (only) data positions from plural different lines (rows) of the input data array. For example, each group (window) of plural input data positions may be configured as a column of input data positions, i.e. a group of data positions that is one data position wide and some plural number of data positions high.

Thus, in an embodiment, the processing operation of the technology described herein (that is performed prior to storing the processed data in the memory) operates to process the data in the vertical direction (only). As will be described in more detail below, configuring the processing operation (that is performed on the data prior to the data being written to the memory) to process the data in the vertical direction only is particularly beneficial in terms of reducing the memory and power requirements of the data processing system. As will be described in more detail below, in this case, any desired horizontal processing may be (and is in an embodiment) performed after the processed data is read from the memory in the form of lines.

Each group of plural input data positions may include data positions from any suitable number of lines (and optionally any suitable number of columns), such as for example, two, three, four or more data lines (and/or one, two, three, four or more data columns). In an embodiment, the second processing stage has some fixed number of filter taps, and the data values of that number of input data positions are used to determine the data value for each output data position in the processing operation.

In the technology described herein, each output data value can be determined using the plural input data values in any suitable manner. In an embodiment, the plural input data values are combined to generate the output data value, e.g. by determining an average, a weighted average, or the like. Other arrangements would be possible.

In an embodiment, the processing operation comprises filtering (interpolation). Thus, in an embodiment, the method of the technology described herein comprises filtering the data (and the second processing stage comprises a filter configured to filter the data).

Where, as described above, the processing operation operates to process the data in both the vertical and horizontal directions, then the processing operation may comprise vertical and horizontal (two-dimensional) filtering. However, in an embodiment the processing operation of the technology described herein (that is performed prior to storing the processed data in the memory) comprises vertical filtering. In this case, any desired horizontal filtering may be (and is in an embodiment) performed after the processed data is read from the memory in the form of lines (as will be described in more detail below).

Thus, in an embodiment, the data (in the form of blocks of data) is vertically filtered prior to the data being stored in the memory (and the second processing stage comprises a vertical filter configured to vertically filter the data).

Correspondingly, another embodiment of the technology described herein comprises a method of operating a data processing system comprising:
producing data in the form of blocks of data, where each block of data represents a particular region of a data array;
vertically filtering the data;
storing the vertically filtered data in a memory of the data processing system; and
reading the data from the memory in the form of lines.

Another embodiment of the technology described herein comprises a data processing system comprising:
a first processing stage operable to produce data in the form of blocks of data, where each block of data represents a particular region of a data array;
a filter configured to vertically filter the data;
a memory, wherein the data processing system is configured to store the vertically filtered data in the memory; and
a processing stage operable to read the data from the memory in the form of lines.

As will be appreciated by those having skill in the art, these embodiments can, and in an embodiment do, include any one or more or all of the optional features described herein, as appropriate.

Thus, for example, (and as will be described in more detail below), horizontal filtering may be (and is in an embodiment) performed after the processed data is read from the memory in the form of lines.

In these embodiments, any suitable type of filtering (interpolation) may be used, such as for example, nearest neighbour interpolation, bilinear interpolation, bicubic interpolation, polyphase interpolation, and the like.

Additionally or alternatively, the processing operation of the technology described herein may comprise scaling (upscaling or downscaling). Thus, in an embodiment, the method of the technology described herein comprises scaling (upscaling or downscaling) the data (and the second processing stage comprises a scaler configured to scale (upscale or downscale) the data).

Where, as described above, the processing operation operates to process the data in both the vertical and horizontal directions, then the processing operation may comprise vertical and horizontal (two-dimensional) scaling (upscaling and/or downscaling). However, in an embodiment the processing operation of the technology described herein (that is performed prior to storing the processed data in the memory) comprises vertical scaling (upscaling or downscaling). In this case, any desired horizontal scaling may be (and is in an embodiment) performed after the processed data is read from the memory in the form of lines (as will be described in more detail below).

Thus, in an embodiment, the data (in the form of blocks of data) is vertically scaled (upscaled or downscaled) prior to the data being stored in the memory.

Correspondingly, another embodiment of the technology described herein comprises a method of operating a data processing system comprising:
producing data in the form of blocks of data, where each block of data represents a particular region of a data array;
vertically scaling the data;
storing the vertically scaled data in a memory of the data processing system; and
reading the data from the memory in the form of lines.

Another embodiment of the technology described herein comprises a data processing system comprising:
a first processing stage operable to produce data in the form of blocks of data, where each block of data represents a particular region of a data array;
a scaler configured to vertically scaler the data;
a memory, wherein the data processing system is configured to store the vertically scaled data in the memory; and
a processing stage operable to read the data from the memory in the form of lines.

As will be appreciated by those having skill in the art, these embodiments can, and in an embodiment do, include any one or more or all of the optional features described herein, as appropriate.

Thus, for example, (and as will be described in more detail below), horizontal scaling may be (and is in an embodiment) performed after the processed data is read from the memory in the form of lines.

In these embodiments, the data may be upscaled or downscaled. The scaling operation should (and in an embodiment does) use some particular scaling ratio, i.e. ratio of the number of input data positions (or lines) to the number of output data positions (lines). The scaling ratio may be selected as desired.

In these embodiments, the processing operation may operate only to scale (upscale or downscale) the data, but in an embodiment the scaling operation uses filtering when scaling the data (e.g. as described above).

Where the processing operation comprises both filtering and scaling, then the scaling ratio may be the same as or different to the size of the filtering window, i.e. the number of input data positions that are used to determine the data value for each output data position.

Other processing operations in which output data values are determined using data values from plural different lines of the data array would be possible.

As described above, in the technology described herein, data is produced in the form of blocks of data, the data is processed, and then the processed (output) version of the data is stored in the memory of the data processing system.

Although it would be possible to process (e.g. filter and/or scale) one or more or each block of data independently, i.e. without taking into account data values from other blocks of data (such as adjacent blocks of data in the data array), the Applicants have furthermore recognised that doing this can result in the appearance of undesired artefacts, e.g. at the boundaries between adjacent blocks of data of the overall data array. Such artefacts can appear, in particular, for output data positions whose data value would otherwise be determined using the data values of data positions from plural different input blocks of data.

In an embodiment, the data processing system of the technology described herein is configured to reduce or avoid the appearance of such artefacts. This may be done in any suitable manner.

In an embodiment, the data processing system is configured to perform vertical processing operation(s) (e.g. vertical filtering and/or vertical scaling) on the data before the data is stored in the (de-tiler) memory, and is configured to perform horizontal processing operation(s) (e.g. horizontal filtering and/or horizontal scaling) on the data after the data is read from the memory in the form of lines. In other words, the data processing system is in an embodiment configured to perform vertical processing operation(s) on the blocks of data (e.g. tiles) (that are produced by the first processing stage), and to perform horizontal processing operation(s) on the vertically processed data (that is read from the (de-tiler) memory in the form of lines).

Performing horizontal processing operations on the lines of data that are read from the (de-tiler) memory has the effect of avoiding the above described image artefacts at the boundaries between horizontally adjacent blocks of data. This is because the horizontal processing operation(s) will in effect have access to an entire line width of data, as that data is read from the memory in raster line order.

Furthermore, in this case, only a relatively small amount of data need be stored (buffered) at any given time for the horizontal processing operation(s), e.g. by the processing stage(s) that performs the horizontal processing operation(s). In particular, the (horizontal) processing stage(s) in question need only store (buffer) data values for at most one single line of data positions, and in an embodiment less than this (i.e. the processing stage(s) in question need not store (buffer) data values for more than one line of data positions). In other words, the (horizontal) processing stage(s) in question need only store data values for some number (e.g. equal to the number of filter taps) of individual data positions, rather than data values for some number (e.g. equal to the number of filter taps) of lines of data positions.

This means that the size of a memory (buffer) provided locally to the processing stage in question for this purpose can be relatively small, such that its power usage will be relatively small.

Correspondingly, performing vertical processing operations on the blocks of data that are produced by the first processing stage means that it is not necessary for a processing stage or processing stages downstream of the (de-tiler) memory that would otherwise perform these operations to be able to store (buffer) multiple lines of data.

Thus, in an embodiment, the method of the technology described herein comprises:

producing data in the form of blocks of data, where each block of data represents a particular region of a data array;

vertically processing the data (i.e. using the processing operation in which one or more output data values are each determined using data values from plural different lines of the data array);

storing the vertically processed data in a memory of the data processing system;

reading the data from the memory in the form of lines; and horizontally processing the data (i.e. using a processing operation in which one or more output data values are each determined using data values from plural different columns of the data array).

Correspondingly, in an embodiment:

the second processing stage is configured to vertically process the data;

the data processing system is configured to store the vertically processed data in the memory; and the third processing stage and/or one or more fourth processing stages is configured to horizontally process the data (read from the memory) in the form of lines.

As described above, in an embodiment of the technology described herein, data is produced in the form of blocks of data, the data is vertically processed (e.g. using a moving window) to produce an output array of data, and then the vertically processed data is stored in the memory. As also described above, the memory in an embodiment stores only one (full) row of blocks of data.

It will be appreciated that, in this arrangement, the data values for one or more output lines of the output array of data will be (and are in an embodiment) determined using only data values from a single input row of blocks of data, whereas the data values for one or more other output lines of the output array of data will be (and are in an embodiment) determined using data values from plural different input rows of blocks of data.

In an embodiment of the technology described herein, the above described image artefacts due to the boundaries between vertically adjacent blocks of data (i.e. between each row of blocks of data) are avoided by providing a second memory, and using it to store (buffer) one or more lines of data produced by the first and/or second processing stage(s).

Thus, in an embodiment, the data processing system comprises a second memory, which is in an embodiment used, e.g. by the first and/or second processing stage, for storing one or more lines of data.

The second memory is in an embodiment a (local) buffer memory, of the data processing system. Thus, data should be (and is in an embodiment) not (is other than) written out (e.g. to external memory or otherwise) from the processor in question (e.g. display controller), but in an embodiment instead remains internal to the processor in question (e.g. display controller), when it is stored in (and read from) the second memory.

The second memory may be provided as a separate hardware element(s) to the (de-tiler) memory in the data processing system, or these memories may be at least partially formed of shared memory hardware.

In these embodiments, for each line of data of the output data array whose data values are to be determined using data values (only) from a single input row of data blocks, the data values are in an embodiment determined and stored in the (de-tiler) memory, e.g. by the second processing stage writing the data (directly) to the memory.

For each line of data of the output data array whose data values are to be determined using data values from a current input row of data blocks together with data values from the next (e.g. yet to be produced) input row of data blocks, the data values are in an embodiment partially determined, e.g. using (only) the (available) data values from the current row of data blocks. In this case, the appropriate data values from the current input row of data blocks are in an embodiment combined, e.g. so as to produce an output line of partially determined data values.

The partially determined data values are in an embodiment stored in the second memory, e.g. by the second processing stage writing the data to the second memory.

In addition, in this case, the (original) data values of the current input row of data blocks that are to be subsequently used together with data values of the next input row of data blocks to determine output data values are in an embodiment stored in the second memory, e.g. by the first or the second processing stage writing the data to the second memory.

In these embodiments, when the next row of data blocks is produced by the first processing stage, this data is then in an embodiment vertically processed in a corresponding manner.

In particular, for one or more lines of data of the output data array whose data values are to be determined using data values from the previous input row of data blocks together with data values from the new input row of data blocks, the partially determined data values are in an embodiment read from the second memory, e.g. by the second processing stage, and in an embodiment used (e.g. summed or combined using a weighted sum) together with the appropriate data values from the new input row of data blocks to determine the data values for the lines of data in question. It will be appreciated that this is possible since filtering operations typically use averaging or weighted averaging, which in effect amounts to a simple summation.

In addition, for one or more other lines of data of the output data array whose data values are to be determined using data values from the previous input row of data blocks together with data values from the new input row of data blocks, the original data values are in an embodiment read from the second memory, e.g. by the second processing stage, and in an embodiment used together with the appropriate data values from the new input row of data blocks to determine the data values for the lines of data in question.

These data values are in an embodiment stored in the (de-tiler) memory, e.g. by the second processing stage writing the data (directly) to the memory.

For each line of data of the output data array whose data values are to be determined using data values (only) from the new input row of data blocks, the data values are in an embodiment determined and stored in the (de-tiler) memory, e.g. by the second processing stage writing the data (directly) to the memory.

This process is in an embodiment repeated for each row of data blocks, until the entire data array has been vertically processed.

Thus, in an embodiment, the method of the technology described herein comprises vertically processing the data so as to produce a processed (output) version of the data array, wherein vertically processing the data in an embodiment comprises:

for each line of the output data array whose data values are to be determined using data values from a current row of data blocks together with data values from a previous row of data blocks: reading data values of the previous row of data blocks from the second memory, using the read data values together with data values from the current row of data blocks to determine the output data values for the output line, and storing the determined output data values in the (de-tiler) memory.

The method in an embodiment further comprises:

for each line of the output data array whose data values are to be determined using data values from the current row of data blocks: determining the output data values for the output line, and storing the determined output data values in the (de-tiler) memory.

The method in an embodiment further comprises:

for each line of the output data array whose data values are to be determined using data values from a current row of data blocks together with data values from the next row of data blocks: partially determining the output data values for the output data line using (only) data values from the current row of data blocks, and storing the partially determined output data values in the second memory.

In this case, the method in an embodiment further comprises, when the next row of data blocks is produced by the first processing stage:

reading the partially determined output data values from the second memory, using the read data values together with data values from the next row of data blocks to determine the output data values for the output line, and storing the determined output data values in the (de-tiler) memory.

In this regard, the Applicants have recognised that in these arrangements the number of read and write accesses to the second memory will be relatively small, e.g. when compared with the number of read and write accesses that would otherwise be required (e.g. to a buffer memory) in an arrangement in which vertical processing is performed on lines of data after they have been read from the (de-tiler) memory. This then means that the overall power consumption of the data processing system is beneficially reduced.

In addition, the Applicants have recognised that in these arrangements the second memory will be (and is in an embodiment) only used for some (but not all) of the time that the data array is being processed. In particular, the second memory will be (and is in an embodiment) only used when the upper and lower regions (lines) of each row of data blocks are being processed. For intermediate regions (lines) of each row of data blocks (i.e. where data values are determined using data values (only) from a single input row of data blocks), the second memory need not be (and is in an embodiment not (is in an embodiment other than)) used.

This then means that the second memory can be (and is in an embodiment) de-activated (e.g. powered off) when it is not being used, thereby reducing the overall power consumption of the data processing system. Thus, in an embodiment, the method comprises deactivating (and then re-activating) the second memory.

It is believed that the idea of using a second memory in a de-tiler arrangement to store lines of data in this manner is new and advantageous in its own right.

Thus, another embodiment of the technology described herein comprises a method of operating a data processing system comprising:

producing data in the form of blocks of data, where each block of data represents a particular region of a data array;

processing a first row of blocks of data to produce a processed version of the data;

storing one or more first lines of the processed data in a first memory of the data processing system;

storing one or more second lines of the processed data and/or one or more lines of the first row of blocks of data in a second memory of the data processing system;

processing a second row of blocks of data together with one or more of the one or more lines of data stored in the second memory to produce one or more third lines of processed data;

storing the one or more third lines of processed data in the first memory; and reading the data from the first memory in the form of lines.

Another embodiment of the technology described herein comprises a data processing system comprising:

a first processing stage operable to produce data in the form of blocks of data, where each block of data represents a particular region of a data array;

a second processing stage configured to process the data to produce a processed version of the data;

a first memory;

a second memory; and a third processing stage operable to read data from the first memory in the form of lines;

wherein the data processing system is configured to:

process a first row of blocks of data to produce a processed version of the data;

store one or more first lines of the processed data in the first memory;

store one or more second lines of the processed data and/or one or more lines of the first row of blocks of data in the second memory;

process a second row of blocks of data together with one or more of the one or more lines of data stored in the second memory to produce one or more third lines of processed data; and store the one or more third lines of processed data in the first memory.

As will be appreciated by those having skill in the art, these embodiments can, and in an embodiment do, include any one or more or all of the optional features described herein, as appropriate.

Thus, for example, in these embodiments, the data is in an embodiment processed using a processing operation in which one or more output data values are each determined using data values from plural different lines of the data array (i.e. a vertical processing operation), e.g. and in an embodiment as described above.

In these embodiments, the first and second rows of blocks of data are in an embodiment (vertically) adjacent rows of blocks of data of the overall data array.

In these embodiments, the one or more first and third lines of processed data are in an embodiment "fully" processed lines of data, while the one or more second lines of processed data are in an embodiment "partially" processed lines of data, e.g. and in an embodiment as described above.

Although as described above, in an embodiment of the technology described herein, where it is desired to both vertically filter and vertically scale the data, then these processing operations are performed on the data prior to storing the data in the (de-tiler) memory, it may in some cases be desired or preferable to perform the vertical filtering operation prior to storing the data in the (de-tiler) memory, and to then perform the vertical scaling operation on the data after it has been read out from the (de-tiler) memory, e.g. depending on the configuration of the display controller. As described above, where it is desired to both vertically filter and vertically scale the data, the vertical scaling ratio may be the same as or different to the vertical size of the filtering window.

In this regard, the Applicants have furthermore recognised that in the case of vertical downscaling, where the downscaling ratio is greater than the vertical size of the filtering window, not all of the filtered data will need to be stored in the (de-tiler) memory. This is because, where the downscaling ratio is greater than the size of the filtering window, some of the lines of data will not contribute to (will not be used to determine) the data values for any downscaled output lines.

Similarly, where it is desired only to downscale the data as it is read out from the (de-tiler) memory (e.g. without filtering the data), some of the lines of data will not contribute to (will not be used to determine) the data values for any downscaled output lines.

In an embodiment, such lines of data are not (are other than) stored in (written to) the (de-tiler) memory. This beneficially reduces the number of writes to the memory, and thereby reduces the power usage of the data processing system further.

Correspondingly, these lines of data will not be read from the (de-tiler) memory (because they are not stored in the memory). This beneficially reduces the number of memory reads, and again reduces the power usage of the data processing system.

Thus, in an embodiment, the data processing system is configured to identify one or more regions (e.g. lines) of data produced by the first and/or second processing stage that will not (will other than) be required by a processing stage (e.g. vertical downscaling stage) downstream of the (de-tiler) memory, i.e. for its processing (e.g. vertical downscaling) operation. This may be done in any suitable manner, but in an embodiment this is done by taking into account the (vertical) (down)scaling ratio and the size of the (vertical) filter window.

When it is determined that one or more regions (e.g. lines) of data produced by the first and/or second processing stage will not (will other than) be required by the downstream processing (e.g. vertical downscaling) stage, then that region (e.g. line) or those regions (e.g. lines) of data are in an embodiment not (are other than) stored in (written to) the (de-tiler) memory.

Correspondingly, that region (e.g. line) or those regions (e.g. lines) of data are in an embodiment not (are other than) read from the (de-tiler) memory, e.g. by the downstream processing (e.g. downscaling) stage. In this case, dummy data may be provided to the downstream processing (e.g. downscaling) stage, if desired.

It is believed that the idea identifying data that will not be needed for further processing downstream of the de-tiler memory, and then not writing that data to the de-tiler memory, is new and advantageous in its own right.

Thus, another embodiment of the technology described herein comprises a method of operating a data processing system comprising:

producing data in the form of blocks of data, where each block of data represents a particular region of a data array;

storing the data or a processed version of the data in a memory of the data processing system;

reading the data from the memory in the form of lines; and processing the data in the form of lines using a processing operation;

wherein the method further comprises determining whether one or more regions of the data or the processed version of the data will be required for the processing operation; and storing regions of data that are determined to be required for the processing operation in the memory.

Another embodiment of the technology described herein comprises a data processing system comprising:

a first processing stage operable to produce data in the form of blocks of data, where each block of data represents a particular region of a data array;

a memory, wherein the data processing system is operable to store the data or a processed version of the data the memory;

a third processing stage operable to read the data from the memory in the form of lines;

and a fourth processing stage operable to process the data in the form of lines using a processing operation;

wherein the data processing system is configured to:

determine whether one or more regions of the data or the processed version of the data will be required for the processing operation; and store regions of data that are determined to be required for the processing operation in the memory.

As will be appreciated by those having skill in the art, these embodiments can, and in an embodiment do, include any one or more or all of the optional features described herein, as appropriate.

Thus, for example, the data processing system may comprise a second processing stage operable to (vertically) process the data to produce the processed version of the data, e.g. and in an embodiment as described above.

In an embodiment, only regions of data that are determined to be required for the processing operation are stored in the memory. Thus, in an embodiment, regions of data that are determined not to be (other than) required for the (e.g. vertical downscaling) processing operation are not (are other than) stored in the memory.

Each of the regions in an embodiment corresponds to a line. Thus, the method in an embodiment comprises determining whether one or more lines of the data or the processed version of the data will be required for the processing operation, and (only) storing lines of data that are determined to be required for the processing operation in the memory.

In these embodiments, the processing operation may comprise any suitable processing operation, e.g. as described above, but in an embodiment comprises vertical downscaling.

In the technology described herein, where it is desired to both vertically filter and vertically scale the data, and where the data processing system is configured to perform vertical scaling on the data after it has been read from the memory (in the form of lines), in the case of vertical upscaling, the data is in an embodiment not (is other than) filtered prior to being written to the (de-tiler) memory. This is because the same group of input lines may be required when determining the data values for more than one scaled output data line (e.g. using different weighting coefficients).

Thus, where it is desired to both vertically filter and vertically upscale the data, this may be done after the data has been read from the memory (in the form of lines), e.g. by a fourth processing stage (e.g. scaler) of the data processing system.

In this regard, the Applicants have furthermore recognised that in these arrangements, the (de-tiler) memory of the data processing system will in effect store lines of data that are required by the fourth processing (scaler) stage. As such, storing (buffering) these lines of data locally to the fourth processing (scaling) stage can mean that data is stored simultaneously in two locations. This can be necessary in conventional arrangements since the data is only ever read from the (de-tiler) memory in strict line-by-line (raster) order.

In an embodiment of the technology described herein, the (third processing stage of the) data processing system is configured to be able to re-send (re-read) one or more lines of data from the de-tiler memory. In other words, the same line of data may be (and is in an embodiment) read plural times from the de-tiler memory. This is in contrast with known arrangements whereby the data is always read out from the de-tiler memory in line-by-line order.

In particular, the (third processing stage of the) data processing system is in an embodiment configured to be able to re-send (re-read) the "last", i.e. most recent, line of data (i.e. the line of data that was most recently read) from the de-tiler memory.

As described above, in the case of vertical scaling that uses filtering (interpolation), the scaler would normally be configured to store a number of lines of data equal to the number of filter taps. By configuring the data processing system to be able to re-send (re-read) the most recent line of data, the number of lines that are required to be stored locally by the scaler can be reduced by one. As such, the size of the (buffer) memory provided for this purpose can be reduced, thereby reducing the chip area and power requirements of the overall data processing system.

Thus, according to an embodiment, the (third processing stage of the) data processing system is operable to re-send (re-read) one or more lines of data stored in the (de-tiler) memory. In an embodiment, the (third processing stage of the) data processing system is operable to re-send (re-read) the most recent line of data that has been read from the memory.

The data processing system may be configured to do this in any suitable manner. In an embodiment, the fourth processing stage (e.g. scaler) is operable to indicate to the third processing stage or a controller of the (de-tiler) memory, that a particular (e.g. the most recent) line of data is required again (and should be re-sent (re-read)), e.g. by the fourth processing stage sending a suitable message to the third processing stage and/or a controller of the (de-tiler) memory. The (third processing stage of the) data processing system is in an embodiment operable, in response to the message, to re-send (re-read) the particular (e.g. most recent) line of data read from the memory.

It is believed that the idea of configuring a de-tiler arrangement to be able to re-send one or more lines of data is new and advantageous in its own right.

Thus, another embodiment of the technology described herein comprises a method of operating a data processing system comprising:

a first processing stage of the data processing system producing data in the form of blocks of data, where each block of data represents a particular region of a data array;

storing the data or a processed version of the data in a memory of the data processing system;

a third processing stage of the data processing system reading the data from the memory in the form of lines; and a fourth processing stage of the data processing system processing the data using a processing operation;

the method further comprising:

the fourth processing stage indicating to the third processing stage that a particular line of data is required for its processing operation; and the third processing stage re-reading the particular line of data from the memory in response to the indication.

Another embodiment of the technology described herein comprises a data processing system comprising:

a first processing stage operable to produce data in the form of blocks of data, where each block of data represents a particular region of a data array;

a memory, wherein the data processing system is configured to store the data or a processed version of the data in the memory; and a third processing stage operable to read the data from the memory in the form of lines;

a fourth processing stage operable to process the data;

wherein the fourth processing stage is operable to indicate to the third processing stage that a particular line of data is required for its processing operation; and wherein the third processing stage is operable to re-read the particular line of data from the memory in response to the indication.

As will be appreciated by those skilled in the art, these embodiments of the technology described herein can and in an embodiment do include one or more, and in an embodiment all, of the optional features of the technology described herein described herein.

Thus, for example, the processing operation is in an embodiment a (vertical) processing operation in which one or more output data values are each determined using data values from plural different lines of the data array, such as vertical scaling and/or filtering. In an embodiment, the processing operation comprises vertical upscaling.

Equally, the particular line of data is in an embodiment the most recent line of data that was read from the memory.

The fourth processing stage in an embodiment indicates to the third processing stage that a particular line of data is required for its processing operation by means of a predetermined message, e.g. flag. However, other arrangements would be possible.

In these embodiments, the data processing system may comprise a second processing stage operable to (vertically) process the data to produce the processed version of the data, e.g. and in an embodiment as described above.

Although the above embodiments have been described in terms of processing (modifying) data (produced in the form of blocks of data), and then storing the processed (modified) data in the (de-tiler) memory, the Applicants have furthermore recognised that the arrangement of the technology described herein, in which data is processed prior to the data being written to the (de-tiler) memory, can be beneficially be used for other processing operations, e.g. which do not necessarily modify the data that is stored in the (de-tiler) memory.

Such processing operations can include, in particular, processing operations where the input data is used to determine metadata. Thus, in an embodiment, the processing operation of the technology described herein additionally or alternatively comprises a processing operation in which metadata is determined. As such, the data (in the form of blocks of data) is in an embodiment processed in order to determine metadata prior to the data being stored in the memory.

It is believed that the idea of using a de-tiler arrangement to determine metadata prior to storing the data in the (de-tiler memory) is new and advantageous in its own right.

Thus, another embodiment of the technology described herein comprises a method of operating a data processing system comprising:

producing data in the form of blocks of data, where each block of data represents a particular region of a data array;

processing the data to produce metadata;

storing the data or a processed version of the data in a memory of the data processing system; and reading the data from the memory in the form of lines.

Another embodiment of the technology described herein comprises a data processing system comprising:

a first processing stage operable to produce data in the form of blocks of data, where each block of data represents a particular region of a data array;

a second processing stage configured to process the data to produce metadata;

a memory, wherein the data processing system is configured to store the processed data in the memory; and a third processing stage operable to read the data from the memory in the form of lines.

As will be appreciated by those skilled in the art, these embodiments of the technology described herein can and in an embodiment do include one or more, and in an embodiment all, of the optional features of the technology described herein described herein.

Thus, for example, in these embodiments, the metadata processing operation may comprise any suitable processing operation. For example, the processing operation may be a vertical processing operation (i.e. in which one or more output data values are each determined using data values from plural different lines of the data array) and/or a horizontal processing operation (i.e. in which one or more output data values are each determined using data values from plural different columns of the data array). It would also be possible in these embodiments for the processing operation to comprise a processing operation in which one or more output data values are each determined using a data value from a single data position of the data array.

The metadata processing operation may comprise any suitable processing operation, and the so-produced metadata may comprise any suitable metadata.

According to various embodiments, the metadata may comprise (i) information relating to the sharpness of the image; (ii) high frequency information; (iii) low frequency information; (iv) object edge detection information; (v) local dynamic range information (and the processing operation comprises a processing operation in which this metadata is determined). It would be possible to determine other types of metadata.

In an embodiment, the metadata is stored in a memory of the data processing system. The metadata may be stored, for example, in the (de-tiler) memory. However, in an embodiment, a third (metadata) memory is provided for storing the metadata.

The third memory is in an embodiment a (local) buffer memory, of the data processing system. Thus, data should be (and is in an embodiment) not (is other than) written out (e.g. to external memory or otherwise) from the processor in question (e.g. display controller), but in an embodiment instead remains internal to the processor in question (e.g. display controller), when it is stored in (and read from) the third memory.

The third memory may be provided as a separate hardware element(s) to the first (de-tiler) and/or second memory in the data processing system, or two or more of these memories may be at least partially formed of shared memory hardware.

The so-determined metadata may be used in any suitable manner.

In one embodiment, the metadata is provided to one or more (fourth) processing stages of the data processing system, e.g. that is operable to process the data in the form of lines. The one or more fourth processing stages may in an embodiment use the metadata, e.g. for its processing operation and/or to improve its processing operation.

For example, the metadata may be provided to a layer or pixel processing pipeline or other image processing stage, and may be used for its image processing operation and/or to improve its image processing operation.

Additionally or alternatively, object edge detection information (e.g. in the form of an edge-map) may be provided to a scaler, e.g. for improved edge-aware scaling.

Additionally or alternatively, statistical information may be provided to a compression stage, e.g. to control the compression rate of the compression stage. In one particular such embodiment, the data in the form of lines is compressed using a compressions stage, e.g. prior to that data being provided for display to a display. In this case, the compression may comprise, for example, Display Stream Compression (DSC), but it would be possible to use other types of compression.

Thus, in an embodiment, the method further comprises:

a fourth processing stage processing the data in the form of lines using a processing operation;

providing the metadata to the fourth processing stage; and the fourth processing stage using the metadata for and/or to control the processing operation.

Correspondingly, the data processing system in an embodiment further comprises:

a fourth processing stage operable to process the data in the form of lines using a processing operation;

wherein the data processing system is operable to provide the metadata to the fourth processing stage; and wherein the fourth processing stage is operable to use the metadata for and/or to control the processing operation.

The fourth processing stage may be any suitable processing stage and the processing operation may be any suitable processing operation, e.g. as described above, such as an image processing stage that performs image processing operations, a scaler that performs scaling, a filter that performs filtering (interpolation), a compression stage that performed compression and/or decompression, etc.

Other arrangements would be possible.

Although the technology described herein is described above with particular reference to the processing of a given data array (e.g. a frame for display), as will be appreciated by those skilled in the art, the technology described herein can be, and is in an embodiment, used for processing plural data arrays (e.g. providing plural frames for display), and in an embodiment for processing a sequence of data arrays (e.g. providing a sequence of frames to be displayed to a display).

The various stages of the data processing system may be implemented as desired, e.g. in the form of one or more fixed-function units (hardware) (i.e. that is dedicated to one or more functions that cannot be changed), or as one or more programmable processing stages, e.g. by means of programmable circuitry that can be programmed to perform the desired operation. There may be both fixed function and programmable stages.

One or more of the various processing stages of the technology described herein may be provided as a separate circuit element(s) to other stages of the data processing system. However, one or more stages may also be at least partially formed of shared data processing circuitry.

One or more of the various stages of the technology described herein may be operable to always carry out its function on any and all received data. Additionally or alternatively, one of more of the stages may be operable to selectively carry out its function on the received data, i.e. when desired and/or appropriate.

The data processing system may and in an embodiment does also comprise one or more of, and in an embodiment all of: a central processing unit, a graphics processing unit, a video processor (codec), a system bus, a memory controller, an image signal processor, a display processing unit, a digital signal processor, and additional elements as known to those skilled in the art.

The data processing system may be, and in an embodiment is, configured to communicate with one or more of (and the technology described herein also extends to an arrangement comprising one or more of): an external memory (e.g. via the memory controller), one or more local displays, and/or one or more external displays.

In an embodiment, the data processing system further comprises a or the display. The display that the display controller is used with may be any suitable and desired display, such as for example, a screen (such as a panel) or a printer.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may comprise a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the display processing pipeline can otherwise include any one or more or all of the usual functional units, etc., that display processing pipelines include.

The display processor in an embodiment also comprises, and/or is in communication with, one or more memories and/or memory devices that store the data described herein, and/or that store software for performing the processes described herein. The display processor may also be in communication with the host microprocessor, and/or with a display for displaying images based on the data generated by the display processor.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An embodiment of the technology described herein will now be described with reference to the Figures.

FIG. 1 shows schematically a data processing system in accordance with an embodiment of the present embodiment. The data processing system comprises a video codec 1, central processing unit (CPU) 2, graphics processing unit (GPU) 3, display controller 4 and a memory controller 7. As shown in FIG. 1, these communicate via an interconnect 6 and have access to off-chip main memory 8. The video codec 1, CPU 2, and/or the GPU 3 generate output surfaces and store them, via the memory controller 7, in a frame buffer in the off-chip memory 8. The display controller 4 then reads output surfaces from the frame buffer in the off-chip memory 8 via the memory controller 8 and sends them to a display 5 for display.

Figure 2:
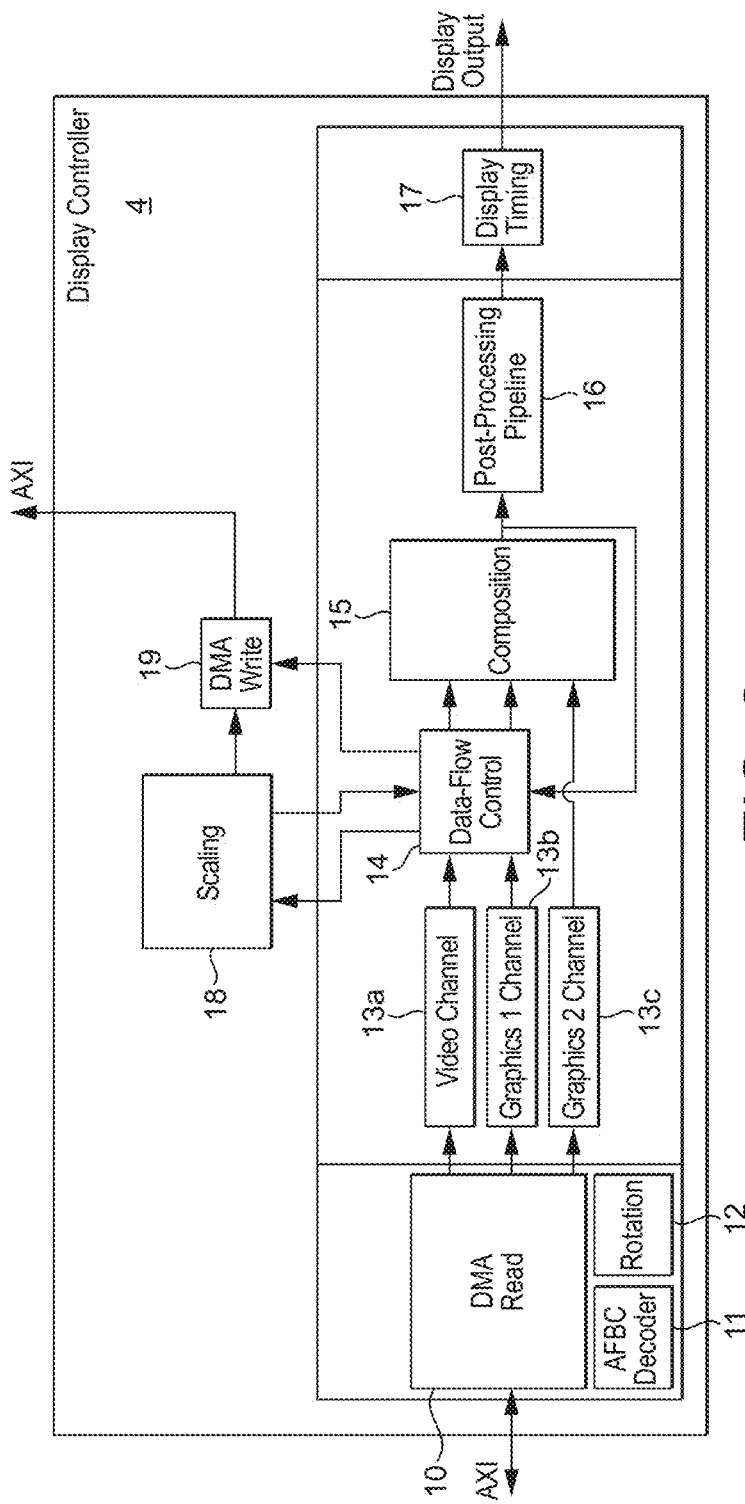
FIG. 2 shows schematically a display controller in accordance with an embodiment of the technology described herein.

FIG. 2 shows schematically a display controller 4 in accordance with an embodiment of the technology described herein. In FIG. 2, the rectangles represent functional units of the display controller, while the arrowed lines represent connections between the various functional units.

FIG. 2 shows the main elements of the display controller 4 that are relevant to the operation of the present embodiment. As will be appreciated by those skilled in the art there will be other elements of the display controller 4 that are not illustrated in FIG. 2. It should also be noted here that FIG. 2 is only schematic, and that, for example, in practice the shown functional units and stages may share significant hardware circuits, even though they are shown schematically as separate stages in FIG. 2. It will also be appreciated that each of the stages, elements and units, etc., of the display controller 4 as shown in FIG. 2 may be implemented as desired and will accordingly comprise, e.g., appropriate circuitry and/or processing logic, etc., for performing the necessary operation and functions.

In the present embodiment, the display controller 4 comprises a read controller in the form of a Direct Memory Access (DMA) read controller 10. The read controller 10 is configured to read one or more surfaces from main memory 8 (not shown in FIG. 2) via an interface such as an Advance eXtensible Interface (AXI). The one or more surfaces will typically be in the form of (optionally compressed) RGB data.

Co-located with the read controller 10 is a decoder 11 which can be used to (selectively) decode (decompress) received compressed surfaces as necessary, before onward transmission of the one or more decoded (decompressed) surfaces. The decoder 11 may comprise an ARM Frame Buffer Compression (AFBC) decoder (AFBC is described in US A1 2013/0034309). It would, of course, be possible to use other compression schemes. The use of compression reduces the bandwidth associated with the display controller 4 reading surfaces from the off-chip memory 8.

Similarly, rotation unit 12 can be used to selectively rotate one or more of the input surfaces as necessary before onward transmission of the one or more input surfaces.

In the illustrated embodiment, the read controller 10 is configured to (read) up to three different input surfaces (layers) which are to be used to generate a composited output frame. In this embodiment, the three input layers comprise one video layer, e.g. generated by a video processor (codec), and two graphics layers, e.g. two graphics windows generated by a graphics processing unit (GPU). Hence, FIG. 2 shows the displayer controller onwardly transmitting three input surfaces (display layers) via three layer pipelines or channels, namely video channel 13a, a first graphics channel 13b, and a second graphics channel 13c. Any or all of the transmitted input surfaces may have been subjected to decoding (decompression) by decoder 11 and/or rotation by rotation unit 12, as discussed above.

Although the embodiment of FIG. 2 illustrates the use of three input surfaces, it will be appreciated that any number of input surfaces (layers), and any combination of one or more types of input surface (e.g. video and/or graphics layers, etc.), may be used in the technology described herein, depending on the application in question (and also depending on any silicon area constraints, etc.). Equally, any number of layer pipelines or channels may be provided and used, as desired. For example, in one embodiment the display controller 4 supports two video layers and two graphics layers.

The display controller 4 of the present embodiment optionally comprises a multiplexer/data-flow control 14. Where present, the display controller may be configured such that multiplexer 14 receives inputs from any one or more (or all) of the input surface channels. The multiplexer 14 may operate to selectively transmit any one or more (or all) of the received inputs (i.e. surfaces) to any one or more of the multiplexer's 14 outputs.

The display controller 4 of the present embodiment optionally comprises a composition unit 15. Where present, the display controller 4 may be configured such that the composition unit 15 receives inputs directly from any one or more or all of the channels 13, and/or from the multiplexer 14. The composition unit 15 may operate to compose the received input surfaces to generate a composited output frame, i.e. by appropriate blending operations, etc. In the illustrated embodiment, the composited output frame may be onwardly transmitted by the composition unit 15 to multiplexer 14, and/or to post-processing pipeline 16.

The post-processing pipeline 16 is configured to selectively carry out any desired processing operation(s) on the (composited) output surface (frame). The post-processing pipeline 16 may, for example, comprise a colour conversion stage operable to apply a colour conversion to the (composited) output frame, a dithering stage operable to apply dithering to the (composited) output frame, and/or a gamma correction stage operable to carry out gamma correction on the (composited) output frame.

In the present embodiment, the post-processing pipeline 16 is configured to transmit the (processed) composited output frame to an output stage comprising a display timing unit 17 for appropriate display on a (local) display (not shown). The display timing unit 17 is configured to send pixel data to the display with appropriate horizontal and vertical blanking periods.

The display controller 4 of the present embodiment optionally comprises a scaling engine 18. Where present, the scaling engine 18 operates to (selectively) scale (i.e. upscale or downscale) any one or more received surfaces (frames) to generate a scaled surface (frame).

In the present embodiment, the display controller optionally comprises a write controller 19, e.g. in the form of a DMA write controller. Where present, the write controller 19 may be configured to write out received surfaces (frames) to external memory 8 (e.g. frame buffer), e.g. via AXI.

Thus, this embodiment of the technology described herein comprises a display controller that integrates a decoder 11, and a rotation unit 12, together with a composition unit 15, and/or a scaling engine 18 capable of up and down-scaling surfaces. The decoder 11 and the rotation unit 12 are embedded within the display controller, such that surfaces read by the display controller 4 may be decoded (decompressed) and/or rotated (and then optionally further processed, e.g. composited and/or scaled) before being displayed, with only a single read (of each input surface) from the frame buffer being required.

Figure 3:
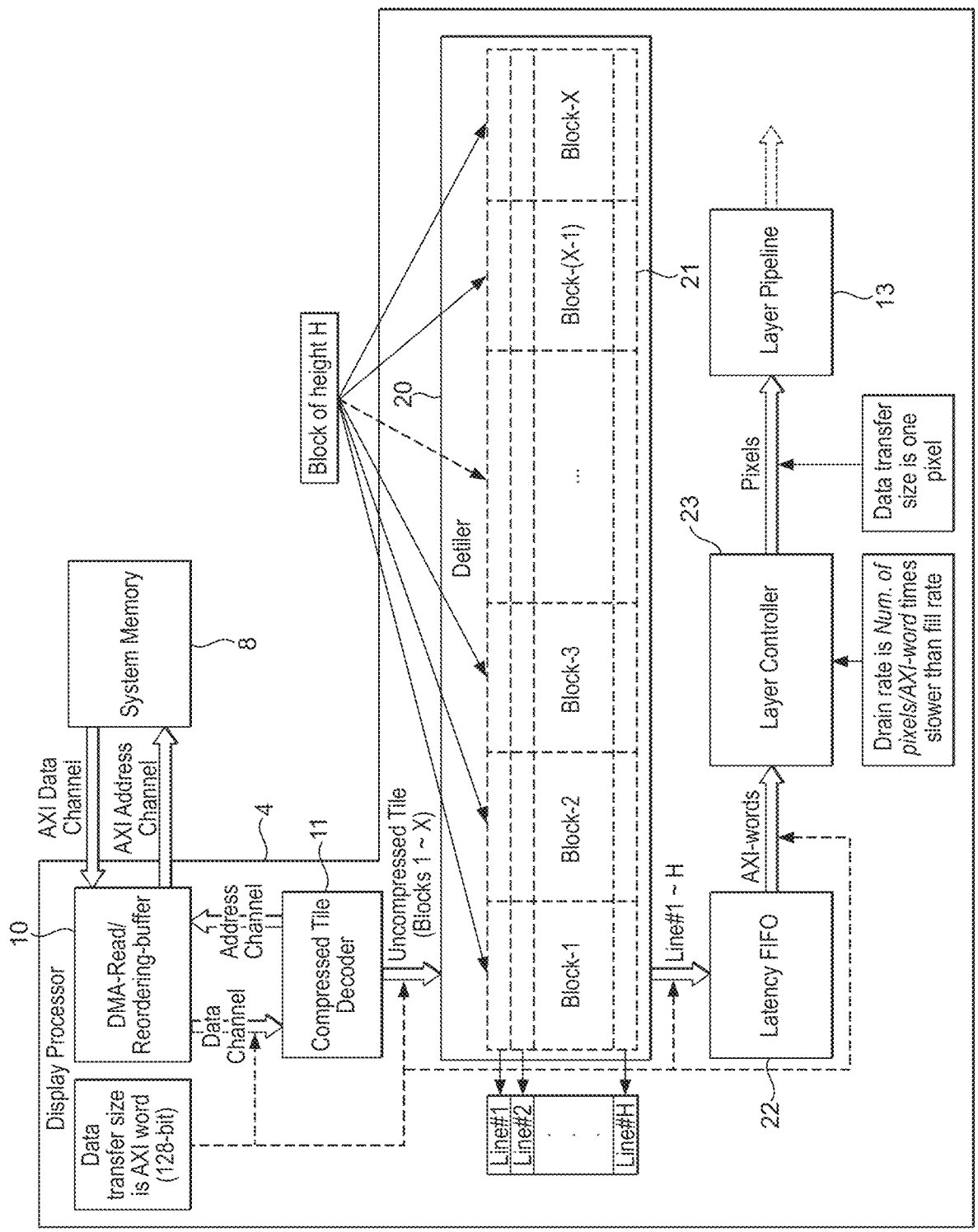
FIG. 3 shows schematically a portion of a display controller in accordance with an embodiment of the technology described herein.

FIG. 3 shows in more detail a portion of the display controller 4. In this embodiment, one or more surfaces stored in the frame buffer in the off-chip memory 8 are compressed using AFBC or another block-based encoding scheme.

In AFBC and other block-based encoding schemes, each compressed surface is encoded as plural blocks (tiles) of data, where each block (tile) of data represents a particular region of the surface. Accordingly, the display controller 4 fetches each surface from the frame buffer in the off-chip memory 8 in blocks (tiles), i.e. block by block (tile by tile). In contrast, the display controller 4 provides output images for display to the display 5 in raster lines, i.e. rows of pixel positions that are one pixel position high and many pixels positions wide (long). Accordingly, the display controller 4 converts read block (tile) data into raster line data, and then sends the raster line data to the display 5 for display.

In the present embodiment, the read controller 10 is configured to read one or more blocks (tiles) of the compressed surface from main memory 8 via an interface such as an Advance eXtensible Interface (AXI). To do this, the read controller 10 sends requests to the memory 8 via an (AXI) address channel, and receives data from the memory 8 via a (AXI) data channel. The read controller 10 may comprise a re-ordering buffer to allow blocks (tiles) that are received by the read controller 10 out of order to be re-ordered, if desired.

The one or more compressed blocks (tiles) will be in the form of AFBC encoded RGB data.

Compressed blocks (tiles) read by the read controller 10 are then onwardly transmitted to the decoder 11 via an interface such as an AXI interface or a valid/ready interface. The decoder 11 operates to decode the compressed blocks (tiles) to produce uncompressed tiles, e.g. of RGB data. The uncompressed blocks are then onwardly transmitted to a de-tiler 20 in the form of data words such as AXI words. Each word may include data in respect of multiple pixels (data positions) of the block (tile).

The de-tiler 20 operates to convert the block (tile) data to raster line data. As shown in FIG. 3, in order to do this, the de-tiler 20 comprises a buffer memory 21. Block (tile) data received by the de-tiler 20 is written to the buffer 21 block by block (tile by tile), and then raster line data in the form of data words such as AXI width words is read out from the buffer 21 by reading the appropriate words for each raster line from the buffer 21.

The line data in the form of (AXI) words is then fed to a pixel unpacker or layer controller 23 via a latency-hiding first in first out (FIFO) buffer 22. The pixel unpacker extracts data for individual pixels (data positions) from the received (AXI) words, and onwardly transmits the data to the appropriate channel or layer pipeline 13 for further processing (e.g. as discussed above).

Figure 4:
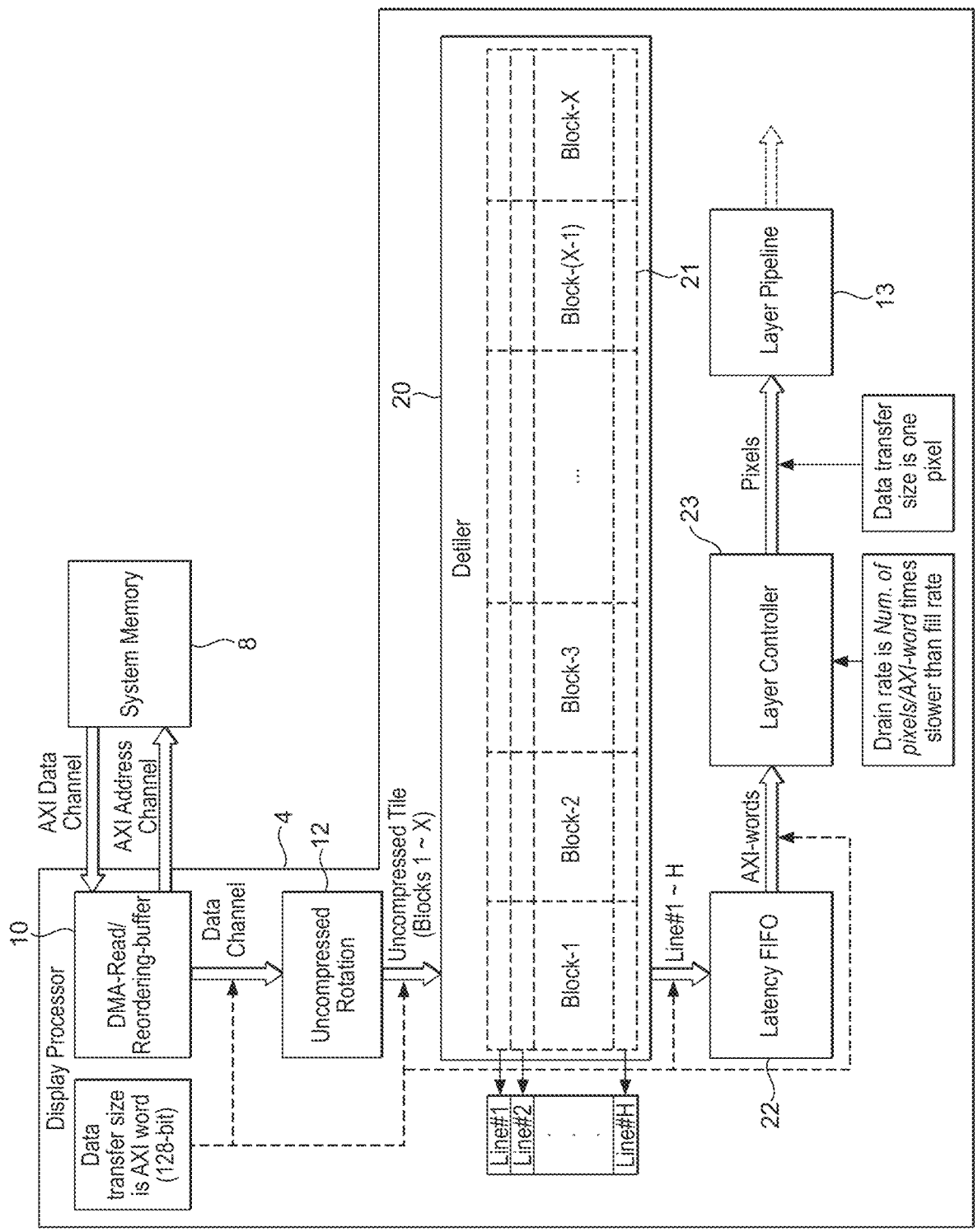
FIG. 4 shows schematically a portion of a display controller in accordance with an embodiment of the technology described herein.

FIG. 4 shows schematically a display controller 4 in accordance with another embodiment. FIG. 4 is similar to FIG. 3, and operates in a substantially similar manner. However, in place of the decoder 11 of FIG. 3 is a rotation stage 12, which e.g. operates to rotate received blocks of data.

Thus, in the embodiment of FIG. 4, the read controller 10 operates to read one or more (uncompressed) surfaces from memory 8, and to pass that data to the rotation stage 12. As shown in FIG. 4, these columns are fed to the rotation block 12, which rotates the data as appropriate, and writes the data to the de-tiler buffer 21 in (AXI) words. The de-tiler 20 reads the data out from the buffer 21 in raster scan order as (AXI) words, and feeds it to the layer controller 23.

As described above, the display controller 4 may be configured to selectively perform a number of different operations on the raster line data. For example, the display controller 4 may be configured to selectively perform image processing operations such as interpolation (or "filtering") on the image data. Any suitable type of interpolation may be used, such as for example, nearest neighbour interpolation, bilinear interpolation, bicubic interpolation, polyphase interpolation, and the like. Filtering is typically used, for example in scaling, de-noising, image enhancement operations, etc.

Figure 5:
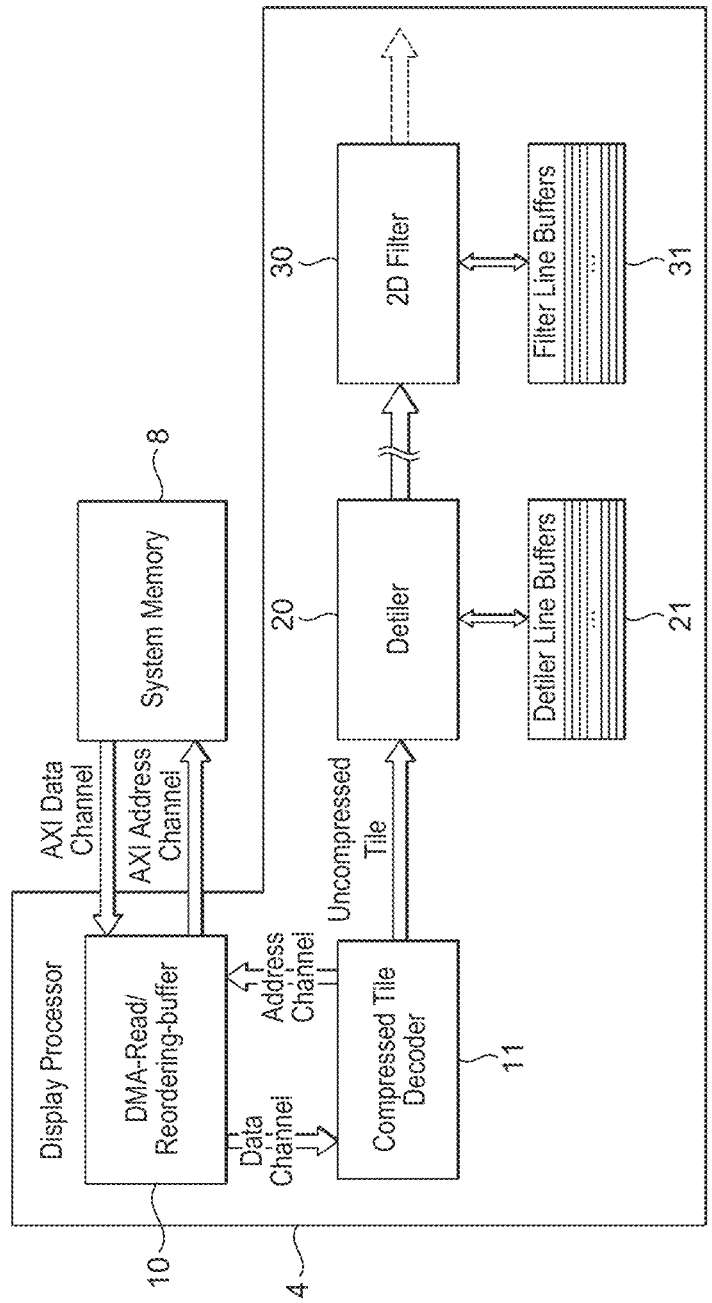
FIG. 5 shows schematically a portion of a display controller in accordance with an embodiment of the technology described herein.

FIG. 5 illustrates a display controller 4 configured to apply filtering to the raster line data from the de-tiler 20. As shown in FIG. 5, the lines of data read out from the de-tiler 20 are subjected to filtering (interpolation) by a two-dimensional (2D) filter 30 which is located downstream of the de-tiler 20. The 2D filter 30 applies filtering (interpolation) to the whole image (layer), in both the horizontal and vertical directions, using a moving window. Accordingly, each (filtered) output data value is determined using the data values of a respective group (window) of input data positions. The input data values within the moving window may be averaged or otherwise processed in accordance with the particular type of interpolation operation being performed.

In the arrangement depicted in FIG. 5, applying horizontal filtering is relatively straightforward because the layer is processed by the display controller 4 downstream of the de-tiler 20 in line by line order (i.e. raster scan order). This means that, in respect of horizontal filtering, the filter 30 need only buffer data values for a limited number of data positions (pixels) in each line at any given time in order to be able to perform its horizontal filtering operation.

However, in order to apply vertical filtering, multiple lines of data (e.g. equal to the number of taps in the filter 30) must be buffered. This is done using line buffers 31. For example, in order to perform a filtering operation that uses a moving window of 3×3 data positions, two lines of data need to be buffered for the vertical filtering operation (whereas the data values of only two data positions need to be buffered for the horizontal filtering operation).

This buffering is relatively costly in terms of memory (e.g. SRAM) area. Moreover, in the arrangement depicted in FIG. 5, the buffers 31 must be enabled for most or all of the time that the frame (layer) is being processed by the display controller 4 because the frame data in effect streams out of the de-tiler 20 to the 2D filter 30 continuously. This in turn means that read and write accesses to the buffer 31 are performed repeatedly during this time.

Figure 6:
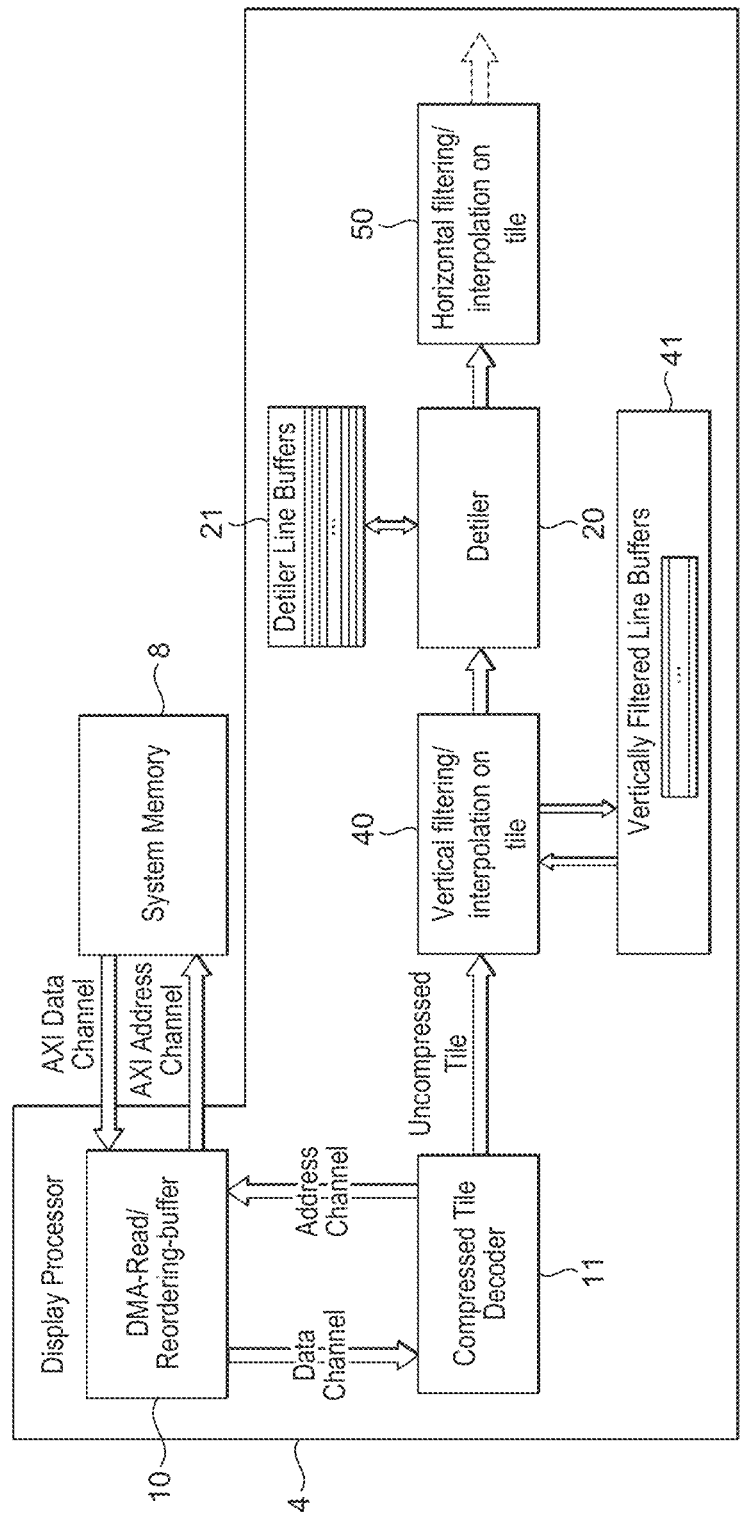
FIG. 6 shows schematically a portion of a display controller in accordance with an embodiment of the technology described herein.

FIG. 6 illustrates an improved display controller in accordance with an embodiment of the technology described herein.

In this embodiment, vertical filtering (interpolation) 40 is applied to tiles before they are written to the de-tiler 20. As such, vertically filtered data is written to the de-tiler buffer 21. Horizontal filtering (interpolation) 50 is then applied to the data after it is read out from the de-tiler buffer (SRAM) 21 in raster scan order.

Accordingly, rather than perform both vertical and horizontal filtering together using a 2D filter 30 downstream of the de-tiler 20, the vertical and horizontal filtering operations are in effect split, and a vertical filter 40 is provided (immediately) upstream of the de-tiler 20 and a horizontal filter 50 is provided downstream of the de-tiler 20.

In this regard, the Applicants have recognised that simply applying conventional filtering (interpolation) operations directly to each tile would lead to blocking artefacts at the boundaries of the tiles. This is because, in order to correctly apply the moving window filter, output data values for data positions at the boundaries of a tile should be determined using input data values that include data values from other (adjacent) tiles.

Accordingly, in the present embodiment, horizontal filtering 50 is performed downstream of the de-tiler 20. This avoids blocking artefacts due to horizontal filtering since, as described above, the data is read out from the de-tiler 20 in line by line order (i.e. raster scan order). In addition, as described above, performing horizontal filtering on lines of data is relatively inexpensive in terms of the memory area required for buffering.

Vertical filtering (interpolation) 40 is applied upstream of the de-tiler 20. This can be done relatively straightforwardly for output data positions whose data values are determined using (only) input data values from the same tile (and without using data values from other (adjacent) tiles). Blocking artefacts will not be produced for these data positions.

The data values for output data positions whose data values are to be determined using the next line of tiles, i.e. the data values of one or more lines at the bottom edge of each tile, cannot be fully determined at the same time as the other data values.

Instead, a partially filtered value is determined for each of these values, i.e. using the input data values from the same tile (and without using data values from other (adjacent) tiles). These partially filtered values are then written to a separate line buffer 51 that is provided for this purpose, together with the original input data values themselves (the data values of data positions of one or more lines at the bottom edge of each tile). These data values will be required to determine the data values for output data positions in the next line of tiles.

When the next row (line) of tiles is produced by the decoder 11, the buffered data is then read from the buffer 41 as appropriate, e.g. in order to determine vertically filtered output values for data positions of the one or more lines at the bottom edge of the tiles in the previous line of tiles, and also for data positions of one or more lines at the top edge of each tile.

Vertical filtering (interpolation) 40 is then applied for output data positions of the next row (line) of tiles whose data values are determined using (only) input data values from the same tile (and without using data values from other (adjacent) tiles), and so on.

In this way, blocking artefacts are avoided, and the 2D filtering (interpolation) operation is in effect applied to each tile of a layer while maintaining the same quality as if the filtering operation were applied to a full layer.

Furthermore, fewer read/write accesses are required to the buffers 21, 41 when using the arrangement depicted in FIG. 6 than are required to the buffers 21, 31 when using the arrangement depicted in FIG. 5. In particular, read and write accesses are limited to the start and end portions of each frame (layer).

This then means that the line buffer 41 can be disabled for at least some time during the processing of each line of tiles, thereby saving power.

As such, the overall effect of the present embodiment is that the amount of power that is used to perform the 2D filtering operation is reduced.

Table 1 illustrates an example of the filtering scheme of the present embodiment. The table illustrates four rows of input tiles (Row-0 to Row-3), where each input tile has a height of eight pixels. In the example shown, a vertical filter is applied to the data that averages the data values of the five nearest neighbour data positions.

As shown in Table 1, the filtered output values for each of the first six lines (lines 1-6) of the first row of tiles (Row-0) are determined using only data values from within the first row of tiles. The filtered output values for each of the last two lines (lines 7 and 8), however, are determined using data values from within the first row of tiles together with data values from the next row of tiles (Row-1).

Accordingly, initially, the filtered output values for each of the first six lines of the first row of tiles (Row-0) are determined, but the filtered output values for the last two lines are only partially determined, i.e. using the data values of the first row of tiles. These partially determine values are buffered in the line buffer 41 together with the original data values of the last two lines (lines 7 and 8).

When the second row of tiles (Row-1) is produced by the decoder 11, the filtered output values for each of the last two lines (lines 7 and 8) of the first row of tiles are then determined using the appropriate buffered partially determined data values together with data values from the second row of tiles (Row-1).

The filtered output values for each of the first two lines (lines 9 and 10) of the second row of tiles (Row-1) are determined using the buffered data values from the first row of tiles together with data values from within the second row of tiles. The filtered output values for each of the next four lines (lines 11-14) of the second row of tiles (Row-1) are determined using only data values from within the second row of tiles.

The filtered output values for each of the last two lines (lines 15 and 16) of the second row of tiles are determined using data values from within the second row of tiles together with data values from the third row of tiles (Row-2). Accordingly, the values for these lines are partially determined, and buffered together with the original data values of these lines (lines 15 and 16) in the line buffer 41, in the manner described above.

This process is repeated in order to apply vertical filtering to the entire frame.

As such, in the example illustrated in Table 1, the last two lines of each row of tiles are buffered together with partially determined values, because a vertical filtering window centred at these lines require samples from lines belonging to the next row of tiles. Equally, a vertical filtering window centred on the first two lines of each row of tiles requires samples from last two lines of the previous row of tiles.

In the arrangement of FIG. 6, there is a significant reduction in power consumption relative to the arrangement of FIG. 5. For example, in order to apply MPEG-2 chroma interpolation to YUV 422 format image data using the approach of FIG. 5, two lines of data must be buffered, thereby consuming around 5% of the total power usage of the display controller. When the approach of FIG. 6 is used however, the buffer needs to be enabled only 1/16th of the time.

|  | Line # | Column of pixels in row of tiles | Vertical Filtering Operation |
|---|---|---|---|
| Row-0 of tiles | 1 | Uv0 | Uv0/5 + uv1/5 + uv2/5 |
|  | 2 | Uv1 | Uv0/5 + uv1/5 + uv2/5 + uv3/5 |
|  | 3 | Uv2 | Uv0/5 + uv1/5 + uv2/5 + uv3/5 + uv4/5 |
|  | 4 | Uv3 | Uv1/5 + uv2/5 + uv3/5 + uv4/5 + uv5/5 |
|  | 5 | Uv4 | Uv2/5 + uv3/5 + uv4/5 + uv5/5 + uv6/5 |
|  | 6 | Uv5 | Uv3/5 + uv4/5 + uv5/5 + uv6/5 + uv7/5 |
|  | 7 | Uv6 | Uv4/5 + uv5/5 + uv6/5 + uv7/5 + uv8/5 |
|  | 8 | Uv7 | Uv5/5 + uv6/5 + uv7/5 + uv8/5 + uv9/5 |
| Row-1 of tiles | 9 | Uv8 | Uv6/5 + uv7/5 + uv8/5 + uv9/5 + uv10/5 |
|  | 10 | Uv9 | Uv7/5 + uv8/5 + uv9/5 + uv10/5 + uv11/5 |
|  | 11 | Uv10 | Uv8/5 + uv9/5 + uv10/5 + uv11/5 + uv12/5 |
|  | 12 | Uv11 | Uv9/5 + uv10/5 + uv11/5 + uv12/5 + uv13/5 |
|  | 13 | Uv12 | Uv10/5 + uv11/5 + uv12/5 + uv13/5 + uv14/5 |
|  | 14 | Uv13 | Uv11/5 + uv12/5 + uv13/5 + uv14/5 + uv15/5 |
|  | 15 | Uv14 | Uv12/5 + uv13/5 + uv14/5 + uv15/5 + uv16/5 |
|  | 16 | Uv15 | Uv13/5 + uv14/5 + uv15/5 + uv/6/5 + uv17/5 |
| Row-2 of tiles | 17 | Uv16 | Uv14/5 + uv15/5 + uv16/5 + uv17/5 + uv18/5 |
|  | 18 | Uv17 | Uv15/5 + uv16/5 + uv17/5 + uv18/5 + uv19/5 |
|  | 19 | Uv18 | Uv16/5 + uv17/5 + uv18/5 + uv19/5 + uv20/5 |
|  | 20 | Uv19 | Uv17/5 + uv18/5 + uv19/5 + uv20/5 + uv21/5 |
|  | 21 | Uv20 | Uv18/5 + uv19/5 + uv20/5 + uv21/5 + uv22/5 |
|  | 22 | Uv21 | Uv19/5 + uv20/5 + uv21/5 + uv22/5 + uv23/5 |
|  | 23 | Uv22 | Uv20/5 + uv21/5 + uv22/5 + uv23/5 + uv24/5 |
|  | 24 | Uv23 | Uv21/5 + uv22/5 + uv23/5 + uv24/5 + uv25/5 |
| Row-3 of tiles | 25 | Uv24 | Uv22/5 + uv23/5 + uv24/5 + uv25/5 + uv26/5 |
|  | 26 | Uv25 | Uv23/5 + uv24/5 + uv25/5 + uv26/5 + uv27/5 |
|  | 27 | Uv26 | Uv24/5 + uv25/5 + uv26/5 + uv27/5 + uv28/5 |
|  | 28 | Uv27 | Uv25/5 + uv26/5 + uv27/5 + uv28/5 + uv29/5 |
|  | 29 | Uv28 | Uv26/5 + uv27/5 + uv28/5 + uv29/5 + uv30/5 |
|  | 30 | Uv29 | Uv27/5 + uv28/5 + uv29/5 + uv30/5 + uv31/5 |
|  | 31 | Uv30 | Uv28/5 + uv29/5 + uv30/5 + uv31/5 + uv32/5 |
|  | 32 | Uv31 | Uv29/5 + uv30/5 + uv31/5 + uv32/5 + uv33/5 |

Various other embodiments relate to scaling, e.g. for accelerating scaling operations. Many scaling operations make use of filtering such as polyphase filtering, bicubic filtering, bilinear filtering, etc., and so the techniques described above can be applied in these cases.

However, in addition to filtering, the scaling operation must also perform simultaneous interpolation (in the case of upscaling) or decimation (in the case of downscaling). Interpolation and decimation require very different behaviours for the line memory 41.

For vertical downscaling, the same set of input lines will be required for only one output line. As such, the downscaling operation is very similar to the filtering operation, described above.

Accordingly, in an embodiment, vertical filtering is performed before writing data to the de-tiler memory 21, and additional line buffers 41 are used when lines of the same window come from different tiles. Vertical downscaling can then be performed after the data has been read from the memory 21.

In this case, as a further optimisation, some write and/or read operations can be skipped, depending on the configuration of the filter. This allows accesses to memory and thereby power to be saved.

In particular, when the downscaling ratio is greater than the size of the filtering window used in the scaler, not all input data (input lines and input pixels) are required to compute all output pixels. This is illustrated by FIG. 7.

Figure 7:
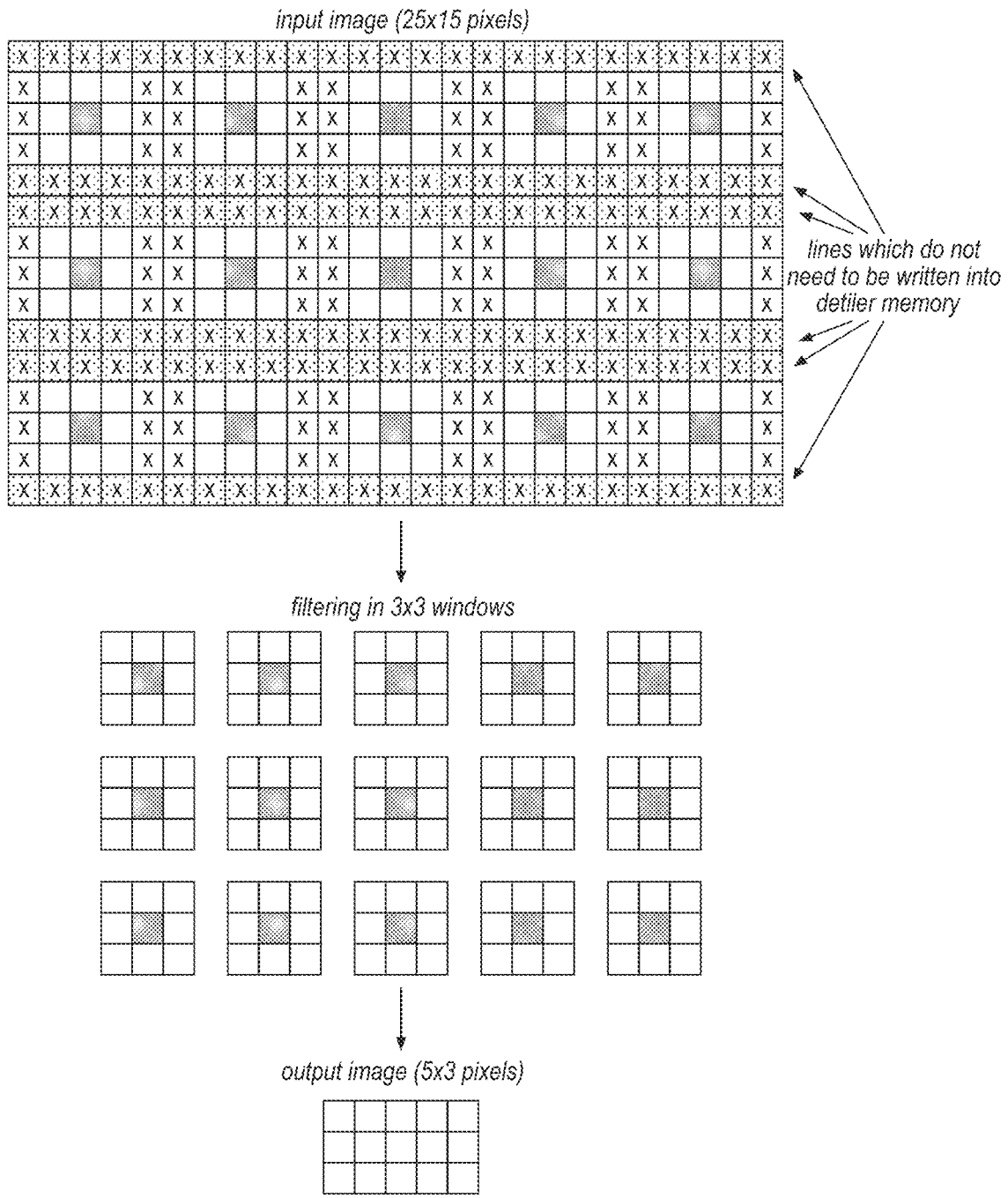
FIG. 7 illustrates schematically a processing operation comprising both filtering and downscaling in accordance with an embodiment of the technology described herein.

In the example shown in FIG. 7, downscaling by five times (from 25×15 to 5×3 pixels) is performed. Filtering is performed using 3×3 windows. As a result, all of the input pixels labelled with an "x" are not analysed in the scaling filter, and can be ignored.

In this embodiment, the controller of the de-tiler memory 21 is provided with information indicative of the downscaling ratio and the size of filtering window, and it uses this information to determine when it can skip writing some lines from each tile to the memory 21. This has the effect of saving power on unnecessary memory writes.

In addition, reading operations can be skipped, also saving power. As such, no data is sent to the scaler in respect of these lines. However, it would be possible to send dummy data to the scaler instead, if desired.

In these embodiments, it would instead be possible to perform simple decimation (without filtering). In this case, reads and writes to the de-tiler memory 21 can again be skipped, i.e. in a corresponding manner.

In the case of vertical upscaling, it would be possible to perform upscaling before the data is written to the de-tiler 20. Vertically upscaled data may be written to the de-tiler memory 21, and then used as normal.

Where vertical upscaling is performed after reading the data from the de-tiler memory 21, the raw (non-filtered) data should be written to the de-tiler memory 21. This is because the same set of input lines are used to compute plural different output lines. For example, each output line may require that the same set of input lines are used with a different set of weighting coefficients.

Figure 8:
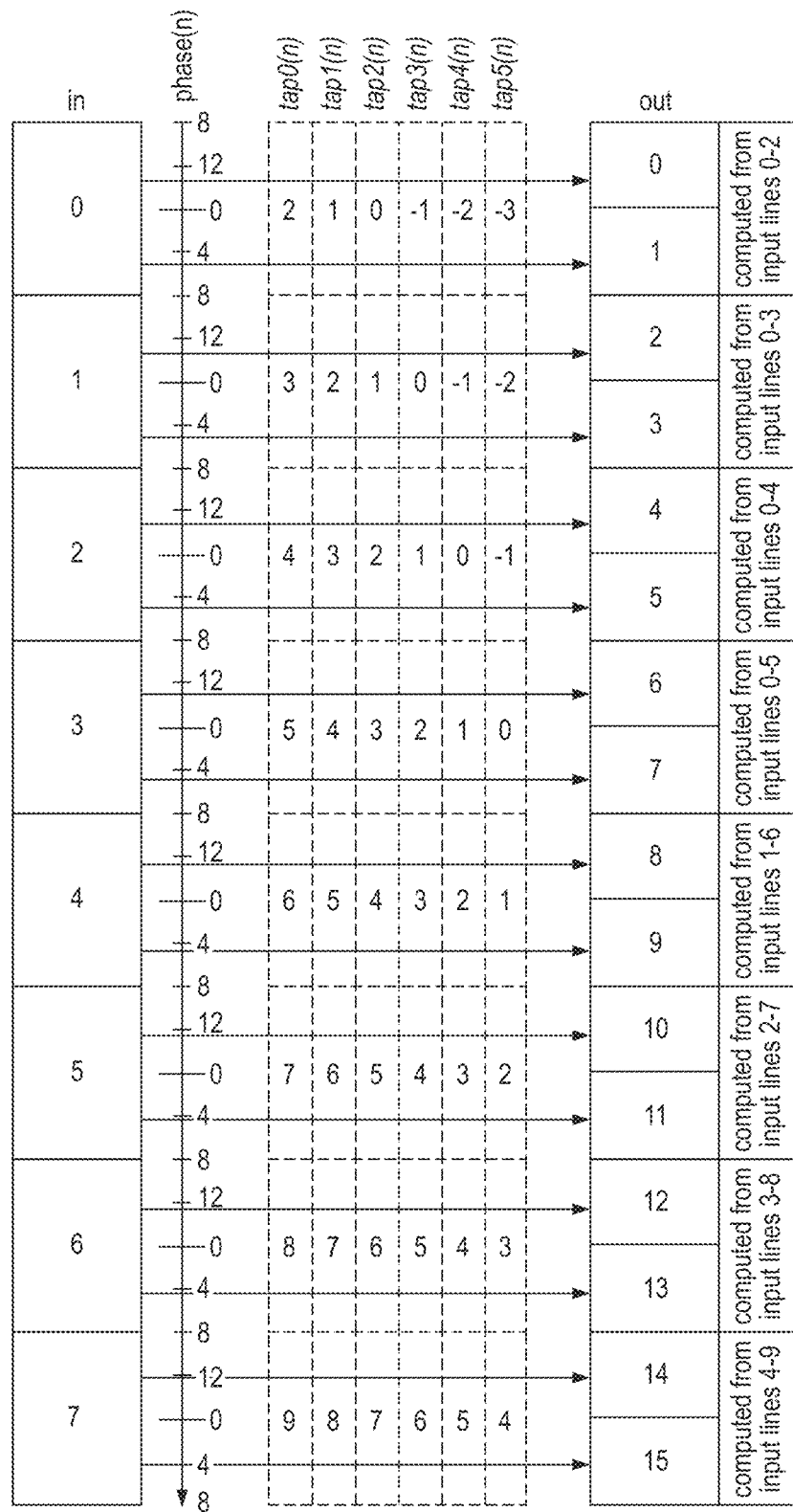
FIG. 8 illustrates schematically a processing operation comprising both filtering and upscaling in accordance with an embodiment of the technology described herein.

This is illustrated by FIG. 8. As illustrated by FIG. 8, every two output lines are computed from the same sets of input lines. However each output line is computed using a different filter phase, which gives rise to a different set of weighting coefficients.

In an embodiment, the display controller 4 is configured such that data stored in the de-tiler memory 21 can be resent from the de-tiler 20 to the scaler 18. This requires a relatively small change to the display controller 4, but reduces the amount of data that must be buffered by the scaler 18.

As described above, and as illustrated by FIG. 9A, standard scalers contain line buffers in a number equal to the number of taps in the vertical filter. This is because standard scalers must remember all of the lines (even the most recent line) since all of the lines may be needed to compute more than one output line.

Figure 9:
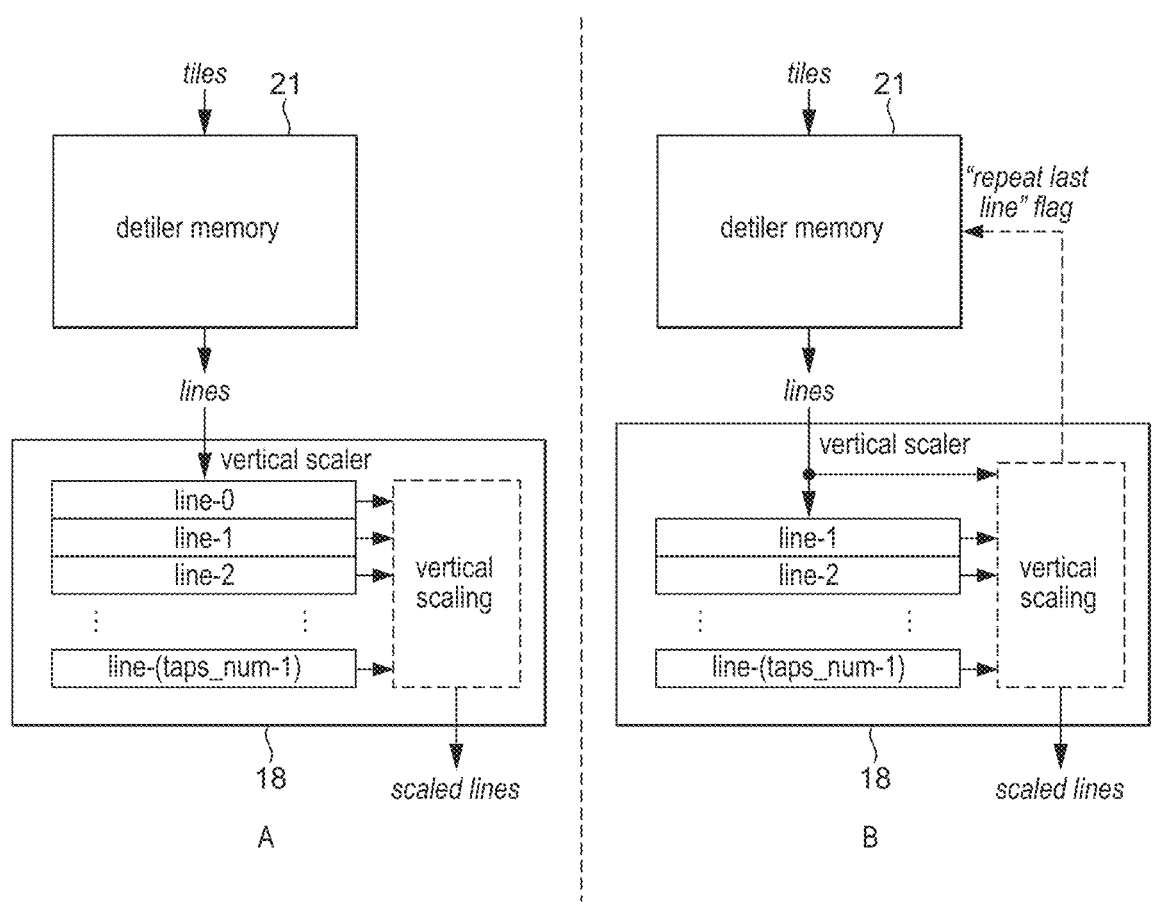
FIG. 9 shows schematically a data processing system in accordance with an embodiment of the technology described herein.

As illustrated by FIG. 9, in the present embodiment, the last line is stored in the de-tiler memory 21 until it is finished being used as a last line for all scaled lines. The line can be read from the de-tiler memory 21 multiple times and sent to the scaler 18 multiple times. In this case, the scaler 18 is configured to inform the de-tiler memory 21 of whether it should send a new line or repeat a previous line, e.g. using a "repeat last line flag".

This arrangement means that there is no need to keep a line buffer for the last line in the scaler 18, and so the number of line buffers for the scaler 18 can be reduced by one. This means that a saving can be made in both chip area (by reducing the number of line buffers by one) and power (by reducing memory accesses).

In these embodiments, it would also be possible to perform simple upscaling (without filtering).

Figure 10:
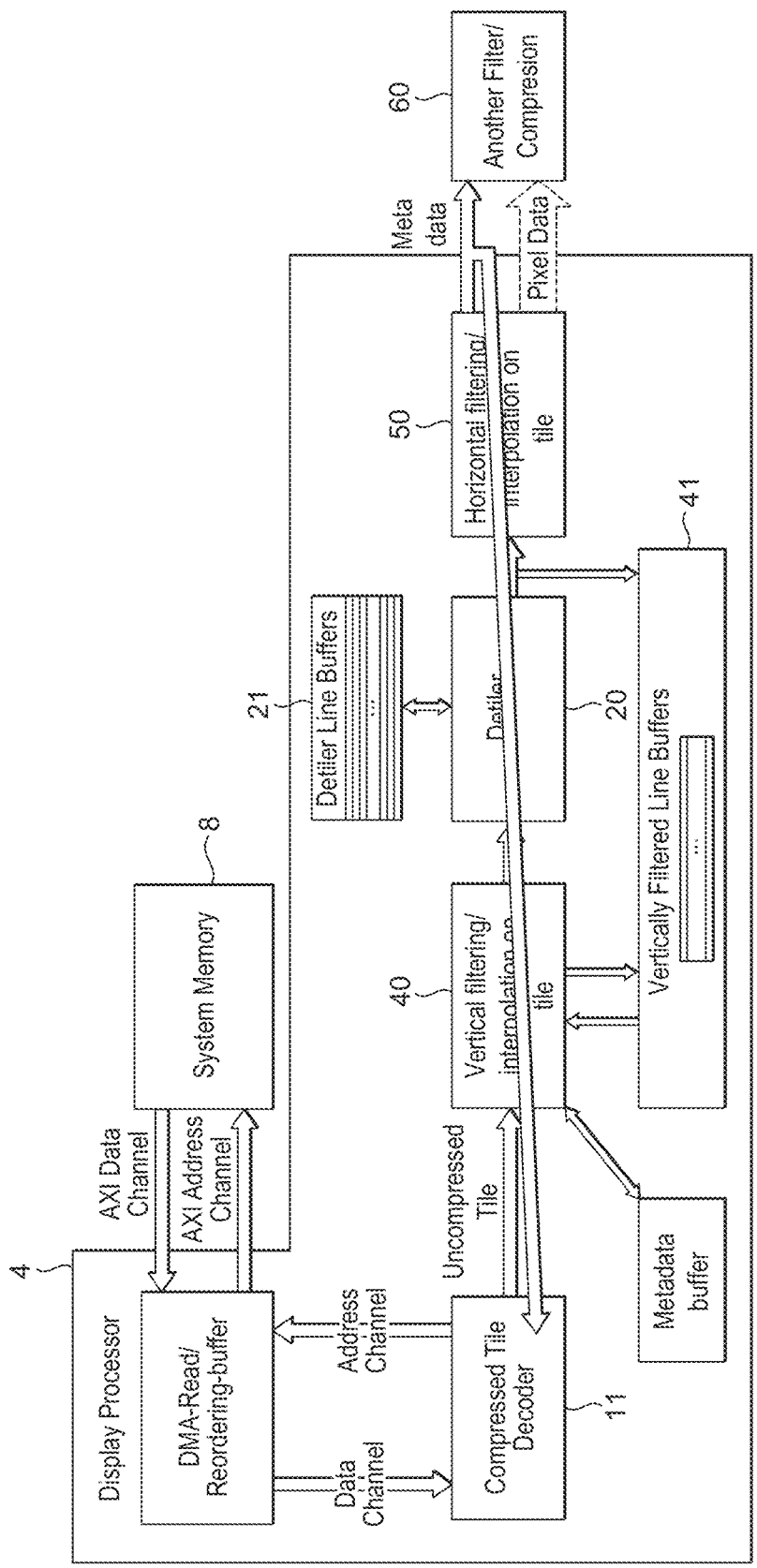
FIG. 10 shows schematically a portion of a display controller in accordance with an embodiment of the technology described herein.

As illustrated by FIG. 10, according to various other embodiments, meta-data is can be generated from a layer using a moving window operation. Additional information such as the sharpness of the image, high frequency information, object edge detection, local dynamic range surrounding a pixel, can be propagated adjacent with the pixels in order to improve another application after de-tiling operation.

In this case, lines at the edge of a line of a tile may be buffered, in a corresponding manner to that described above.

This arrangement can be used as desired. For example, an edge-map can be provided for edge-aware scaling for improved quality. Another example is to provide statistics for a lossy/lossless compression for the image ahead of time in order to improve rate control mechanisms. In this case, the extracted metadata can be used to feedback into the decompression block for improved lossy performance.

Other arrangements would be possible.

It can be seen from the above that the embodiments of the technology described herein enable reduction of power consumption within a data processing system, e.g. where block (tile) data is converted to line data by writing the block data to a memory and then reading the data in the form of lines from the memory. This is achieved, in embodiments at least, by vertically processing the data before it is written to the memory.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system comprising a display controller, the display controller of the data processing system comprising a memory, the method comprising:

producing input data in the form of blocks of input data, where each block of input data represents a particular region of an input data array comprising a plurality of data positions each having an input data value, and where each block of input data comprises at least two rows of plural data positions and at least two columns of plural data positions; and the display controller:

processing the input data in the form of blocks of input data to produce output data for an output data array comprising a plurality of data positions each having an output data value, where processing the input data in the form of blocks comprises vertically processing the input data in the form of blocks using a vertical processing operation comprising vertically filtering the input data in the form of blocks and/or vertically scaling the input data in the form of blocks, where vertically processing the input data in the form of blocks using a vertical processing operation comprises, for each of one or more data positions of the output data array, determining an output data value by processing plural input data values from plural different data positions of one column of the input data array;

storing the vertically processed output data in the memory of the display controller of the data processing system;

reading the vertically processed output data from the memory of the display controller in the form of lines, where each line comprises a row of data positions that is one data position high and many data positions wide, and where reading the vertically processed output data in the form of lines comprises, for each of one or more lines of the output data array, reading plural output data values from plural different data positions of the line of the output data array; and providing vertically processed output data in the form of lines to a display for display.

2. The method of claim 1, further comprising the display controller horizontally processing the vertically processed output data in the form of lines by horizontally filtering the vertically processed output data and/or horizontally scaling the vertically processed output data after reading the vertically processed output data from the memory of the display controller in the form of lines and before providing the vertically processed output data in the form of lines to the display for display.

3. The method of claim 1, wherein the method comprises:
producing a first row of blocks of input data;
vertically processing the first row of blocks of input data to produce plural lines of vertically processed output data;
storing one or more first lines of the plural lines of vertically processed output data in the memory of the display controller;
storing one or more second lines of the plural lines of vertically processed data or one or more lines of the first row of blocks of input data in a second memory of the data processing system;
producing a second row of blocks of input data;
vertically processing the second row of blocks of input data to produce one or more third lines of vertically processed output data, where vertically processing the second row of blocks of input data comprises, for each of one or more of said one or more third lines of vertically processed data, producing the third line of vertically processed output data using one or more lines of the second row of blocks of input data together with one or more of the one or more lines of data stored in the second memory; and
storing the one or more third lines of vertically processed data in the memory of the display controller.

4. The method of claim 3, further comprising deactivating the second memory when it is not being used.

5. The method of claim 1, further comprising:
processing the vertically processed data in the form of lines using a second processing operation;
determining whether one or more regions of the vertically processed data will be required for the second processing operation; and
only storing regions of the vertically processed data that are determined to be required for the second processing operation in the memory of the display controller.

6. The method of claim 1, further comprising:
a fourth processing stage of the data processing system processing the vertically processed data in the form of lines using a second processing operation;
the fourth processing stage indicating that a particular line of data is required for its processing operation; and
re-reading the particular line of data from the memory of the display controller in response to the indication.

7. The method of claim 1, further comprising processing the data to produce metadata.

8. A method of operating a data processing system comprising a display controller, the display controller of the data processing system comprising a memory, the method comprising:
producing data in the form of blocks of data, where each block of data represents a particular region of a data array comprising a plurality of data positions each having a data value, and where each block of data comprises at least two rows of plural data positions and at least two columns of plural data positions; and
the display controller:
processing the data in the form of blocks of data to produce metadata;
storing the data or a processed version of the data in the memory of the display controller of the data processing system; and
reading the data from the memory of the display controller in the form of lines, where each line comprises a row of data positions that is one data position high and many data positions wide, and where reading the data from the memory of the display controller in the form of lines comprises, for each of one or more lines of the data, reading plural output data values from plural different data positions of the line; and
providing data in the form of lines to a display for display.

9. A data processing system comprising:
a first processing stage operable to produce input data in the form of blocks of input data, where each block of input data represents a particular region of an input data array comprising a plurality of data positions each having an input data value, and where each block of input data comprises at least two rows of plural data positions and at least two columns of plural data positions; and
a display controller comprising:
a second processing stage configured to process the input data in the form of blocks of input data to produce output data for an output data array comprising a plurality of data positions each having an output data value, by vertically processing the input data in the form of blocks using a vertical processing operation comprising vertically filtering the input data in the form of blocks and/or vertically scaling the input data in the form of blocks, where the vertical processing operation is performed by, for each of one or more data positions of the output data array, determining an output data value by processing plural input data values from plural different data positions of one column of the input data array;
a memory, wherein the display controller is configured to store the vertically processed output data in the memory of the display controller;
a third processing stage operable to read the vertically processed output data from the memory of the display controller in the form of lines, where each line comprises a row of data positions that is one data position high and many data positions wide, and where reading the vertically processed output data in the form of lines is performed by, for each of one or more lines of the output data array, reading plural output data values from plural different data positions of the line of the output data array; and
an output stage operable to provide vertically processed output data in the form of lines to a display for display.

10. The data processing system of claim 9, wherein the display controller further comprises a fourth processing stage operable to horizontally process the vertically processed output data in the form of lines by horizontally filtering the vertically processed output data and/or horizontally scaling the vertically processed output data before the vertically processed output data in the form of lines is provided to the display for display.

11. The data processing system of claim 9, wherein the data processing system comprises a second memory, and wherein the data processing system is configured to:
produce a first row of blocks of input data;
vertically process the first row of blocks of input data to produce plural lines of vertically processed output data;
store one or more first lines of the plural lines of vertically processed output data in the memory of the display controller;
store one or more second lines of the plural lines of vertically processed output data or one or more lines of the first row of blocks of input data in the second memory;
produce a second row of blocks of input data;
vertically process the second row of blocks of input data to produce one or more third lines of vertically processed data, where vertically processing the second row of blocks of input data is performed by, for each of one or more of said one or more third lines of vertically processed data, producing the third line of vertically processed output data using one or more lines of the second row of blocks of input data together with one or more of the one or more lines of data stored in the second memory; and
store the one or more third lines of vertically processed data in the memory of the display controller.

12. The data processing system of claim 11, wherein the data processing system is operable to deactivate the second memory when it is not being used.

13. The data processing system of claim 9, further comprising:
a fourth processing stage operable to process the vertically processed data in the form of lines using a second processing operation;
wherein the data processing system is operable to:
determine whether one or more regions of the vertically processed data will be required for the second processing operation; and
only store regions of the vertically processed data that are determined to be required for the second processing operation in the memory of the display controller.

14. The data processing system of claim 9, further comprising:
a fourth processing stage operable to process the vertically processed data in the form of lines using a second processing operation;
wherein the fourth processing stage is operable to indicate that a particular line of data is required for its processing operation; and
wherein the third processing stage is operable to re-read the particular line of data from the memory of the display controller in response to the indication.

15. The data processing system of claim 9, wherein the second processing stage is operable to process the data to produce metadata.

16. A data processing system comprising:
a first processing stage operable to produce data in the form of blocks of data, where each block of data represents a particular region of a data array comprising a plurality of data positions each having a data value, and where each block of data comprises at least two rows of plural data positions and at least two columns of plural data positions; and
a display controller comprising:
a second processing stage configured to process the data in the form of blocks of data to produce metadata;
a memory, wherein the display controller is configured to store the processed data in the memory of the display controller;
a third processing stage operable to read the data from the memory of the display controller in the form of lines, where each line comprises a row of data positions that is one data position high and many data positions wide, and where reading the data from the memory of the display controller in the form of lines is performed by, for each of one or more lines of the data, reading plural output data values from plural different data positions of the line; and
an output stage operable to provide data in the form of lines to a display for display.

17. A non-transitory computer readable storage medium storing computer software code which when executing on a processor performs a method of operating a data processing system comprising a display controller, the display controller of the data processing system comprising a memory, the method comprising:
producing input data in the form of blocks of input data, where each block of input data represents a particular region of an input data array comprising a plurality of data positions each having an input data value, and where each block of input data comprises at least two rows of plural data positions and at least two columns of plural data positions; and
the display controller:
processing the input data in the form of blocks of input data to produce output data for an output data array comprising a plurality of data positions each having an output data value, where processing the input data in the form of blocks comprises vertically processing the input data in the form of blocks using a vertical processing operation comprising vertically filtering the input data in the form of blocks and/or vertically scaling the input data in the form of blocks, where vertically processing the input data in the form of blocks using a vertical processing operation comprises, for each of one or more data positions of the output data array, determining an output data value by processing plural input data values from plural different data positions of one column of the input data array;
storing the vertically processed output data in the memory of the display controller of the data processing system;
reading the vertically processed output data from the memory of the display controller in the form of lines, where each line comprises a row of data positions that is one data position high and many data positions wide, and where reading the vertically processed output data in the form of lines comprises, for each of one or more lines of the output data array, reading plural output data values from plural different data positions of the line of the output data array; and
providing vertically processed output data in the form of lines to a display for display.

* * * * *